United States Patent
Xu et al.

(10) Patent No.: US 7,934,020 B1
(45) Date of Patent: Apr. 26, 2011

(54) MANAGING NETWORK DATA TRANSFERS IN A VIRTUAL COMPUTER SYSTEM

(75) Inventors: Hao Xu, Sunnyvale, CA (US); Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1008 days.

(21) Appl. No.: 10/665,808

(22) Filed: Sep. 19, 2003

(51) Int. Cl.
G06F 15/16 (2006.01)

(52) U.S. Cl. ........................................ 709/250; 709/223

(58) Field of Classification Search .................. 709/238, 709/250; 718/104
See application file for complete search history.

(56) References Cited

U.S. PATENT DOCUMENTS

| | | | | |
|---|---|---|---|---|
| 5,553,291 A * | 9/1996 | Tanaka et al. | | 718/1 |
| 5,948,069 A * | 9/1999 | Kitai et al. | | 709/240 |
| 6,208,616 B1 * | 3/2001 | Mahalingam et al. | | 370/216 |
| 6,453,392 B1 * | 9/2002 | Flynn, Jr. | | 711/151 |
| 6,567,377 B1 * | 5/2003 | Vepa et al. | | 370/230 |
| 6,795,966 B1 * | 9/2004 | Lim et al. | | 718/1 |
| 6,802,062 B1 * | 10/2004 | Oyamada et al. | | 718/1 |
| 6,810,421 B1 * | 10/2004 | Ishizaki et al. | | 709/226 |
| 6,961,941 B1 * | 11/2005 | Nelson et al. | | 719/319 |
| 7,020,796 B1 * | 3/2006 | Ennis et al. | | 714/4 |
| 7,111,086 B1 * | 9/2006 | Ecoleston et al. | | 710/33 |
| 7,111,303 B2 * | 9/2006 | Macchiano et al. | | 719/313 |
| 7,134,052 B2 * | 11/2006 | Bailey et al. | | 714/44 |
| 7,136,800 B1 * | 11/2006 | Vega | | 703/23 |
| 7,203,944 B1 * | 4/2007 | van Rietschote et al. | | 718/104 |
| 7,225,240 B1 * | 5/2007 | Fox et al. | | 709/223 |
| 7,376,743 B1 * | 5/2008 | Bazzinotti et al. | | 709/229 |
| 7,424,710 B1 * | 9/2008 | Nelson et al. | | 718/1 |
| 7,506,265 B1 | 3/2009 | Traut et al. | | |
| 2002/0069335 A1 * | 6/2002 | Flylnn, Jr. | | 711/153 |
| 2002/0080752 A1 * | 6/2002 | Johansson et al. | | 370/338 |
| 2002/0143842 A1 * | 10/2002 | Cota-Robles et al. | | 709/1 |
| 2002/0143939 A1 | 10/2002 | Riddle et al. | | |
| 2003/0069939 A1 * | 4/2003 | Russell | | 709/214 |
| 2003/0163523 A1 * | 8/2003 | Chang et al. | | 709/203 |
| 2004/0032830 A1 * | 2/2004 | Bly et al. | | 370/235 |
| 2004/0103314 A1 | 5/2004 | Liston | | |
| 2004/0128670 A1 | 7/2004 | Robinson et al. | | |
| 2004/0172574 A1 * | 9/2004 | Wing et al. | | 714/4 |
| 2004/0215858 A1 * | 10/2004 | Armstrong et al. | | 710/200 |
| 2004/0221285 A1 * | 11/2004 | Donovan et al. | | 718/1 |
| 2004/0267866 A1 * | 12/2004 | Carollo et al. | | 709/200 |
| 2007/0276941 A1 | 11/2007 | Yodaiken | | |

* cited by examiner

*Primary Examiner* — Kevin Bates
*Assistant Examiner* — Jason Recek
(74) *Attorney, Agent, or Firm* — Darryl A. Smith

(57) ABSTRACT

A virtual computer system, including one or more virtual machines (VMs), is connected to a computer network by multiple network interface cards (NICs). The VMs are supported by a kernel, which includes a resource manager for allocating system resources among the VMs, including network data bandwidth. A NIC manager is loaded into the kernel as a driver or is integrated into the kernel, for selecting NICs over which outgoing network data is transferred, including providing functions such as failovers and failbacks, as well as load distribution. Implementing the NIC manager in the kernel provides NIC teaming functions to each of the VMs without having to implement a NIC teaming solution in each of the VMs, adding to the simplicity, flexibility and portability of the VMs. In addition, integrating the NIC manager into the kernel improves the kernel's ability to manage the VMs and to implement network resource allocations for the VMs.

19 Claims, 5 Drawing Sheets

MANAGING NETWORK DATA TRANSFERS IN A VIRTUAL COMPUTER SYSTEM

BACKGROUND OF THE INVENTION

1. Field of the Invention

This invention relates to virtualized computer systems, and, in particular, to a system and method for managing network data transfers through multiple network interface cards in a single physical computer system hosting a virtualized computer system.

2. Description of the Related Art

Computer networks, such as corporate intranets and the global Internet, are ubiquitous and they are extremely important to the operation of many businesses, and other organizations worldwide. Two important properties of a computer network are the network's reliability and the amount of data that can be transferred across the network. One important aspect of implementing a computer network is the method by which computers are connected to the network, including both server computers and client computers. One recognized method of achieving a reliable, high bandwidth network connection in many situations is to use multiple network interface cards (NICs) in a single physical computer system, and to implement a NIC teaming solution. For example, multiple conventional Ethernet adapters may be used in a single computer system, such as a conventional computer system based on the Intel IA-32 architecture, running a conventional operating system (OS), such as any of the common distributions of the Linux OS or a Windows OS from Microsoft Corporation. A standard NIC teaming solution may then be installed in the computer system, such as the Broadcom Advanced Server Platform (BASP) from Broadcom Corporation or the Advanced Network Services solution (ANS) from Intel Corporation, although these NIC teaming solutions are only compatible with selected hardware and software configurations. As another option for Linux systems, installing the Linux bonding driver can provide a more versatile NIC teaming solution. As is well known in the art, these NIC teaming solutions generally provide failover and fail back capabilities in the event of a NIC failure, as well as a load-balancing function between the multiple NICs, providing higher bandwidth and enhanced reliability over the use of just a single NIC.

The advantages of virtual machine technology are also widely recognized. Among these advantages is the ability to run multiple virtual machines on a single host platform. This makes better use of the capacity of the hardware, while still ensuring that each user enjoys the features of a "complete," isolated computer. This invention relates to a virtual computer system that is implemented in a physical computer system having multiple NICs. A general virtual computer system is described below as background information for the invention.

General Virtualized Computer System

As is well known in the field of computer science, a virtual machine (VM) is a software abstraction—a "virtualization"—of an actual physical computer system. FIG. 1 illustrates, in part, the general configuration of a virtual computer system 700A, including a virtual machine 200, which is installed as a "guest" on a "host" hardware platform 100.

As FIG. 1 shows, the hardware platform 100 includes one or more processors (CPUs) 110, system memory 130, and a local disk 140. The system memory will typically be some form of high-speed RAM, whereas the disk (one or more) will typically be a non-volatile, mass storage device. The hardware 100 will also include other conventional mechanisms such as a memory management unit MMU 150 and various registers 160.

Each VM 200 will typically include at least one virtual CPU 210, at least one virtual disk 240, a virtual system memory 230, a guest operating system 220 (which may simply be a copy of a conventional operating system), and various virtual devices 270, in which case the guest operating system ("guest OS") will include corresponding drivers 224. All of the components of the VM may be implemented in software using known techniques to emulate the corresponding components of an actual computer.

If the VM is properly designed, then it will not be apparent to the user that any applications 260 running within the VM are running indirectly, that is, via the guest OS and virtual processor. Applications 260 running within the VM will act just as they would if run on a "real" computer, except for a decrease in running speed that will be noticeable only in exceptionally time-critical applications. Executable files will be accessed by the guest OS from a virtual disk or virtual memory, which may simply be portions of an actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), shown as component 300. A VMM is usually a thin piece of software that runs directly on top of a host, or directly on the hardware, and virtualizes the resources of the physical host machine. Among other components, the VMM therefore usually includes device emulators 330, which may constitute the virtual devices 270 that the VM 200 accesses. The interface exported to the VM is then the same as the hardware interface of the machine, so that the guest OS cannot determine the presence of the VMM.

The VMM also usually tracks and either forwards (to some form of operating system) or itself schedules and handles all requests by its VM for machine resources, as well as various faults and interrupts. A mechanism known in the art as an exception or interrupt handler 355 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs.

Although the VM (and thus the user of applications running in the VM) cannot usually detect the presence of the VMM, the VMM and the VM may be viewed as together forming a single virtual computer. They are shown in FIG. 1 as separate components for the sake of clarity.

Moreover, the various virtualized hardware components such as the virtual CPU(s) 210, the virtual memory 230, the virtual disk 240, and the virtual device(s) 270 are shown as being part of the VM 200 for the sake of conceptual simplicity—in actual implementations these "components" are usually constructs or emulations exported to the VM by the VMM. For example, the virtual disk 240 is shown as being within the VM 200. This virtual component, which could alternatively be included among the virtual devices 270, may in fact be implemented as one of the device emulators 330 in the VMM.

The device emulators 330 emulate the system resources for use within the VM. These device emulators will then typically also handle any necessary conversions between the resources as exported to the VM and the actual physical resources. One advantage of such an arrangement is that the VMM may be set up to expose "generic" devices, which facilitate VM migration and hardware platform-independence. For example, the VMM may be set up with a device emulator 330 that emulates a standard Small Computer System Interface (SCSI) disk, so that the virtual disk 240 appears to the VM 200 to be a standard SCSI disk connected to a standard SCSI adapter, whereas the underlying, actual, physical disk 140 may be something else. In this case, a standard SCSI driver is installed into the guest OS 220 as one of the drivers 224. The device emulator 330 then interfaces with the driver 224 and handles disk operations for the VM 200. The device emulator 330 then converts the disk operations from the VM 200 to corresponding disk operations for the physical disk 140.

Virtual and Physical Memory

As in most modern computers, the address space of the memory 130 is partitioned into pages (for example, in the Intel x86 architecture) or other analogous units. Applications then address the memory 130 using virtual addresses (VAs), which include virtual page numbers (VPNs). The VAs are then mapped to physical addresses (PAs) that are used to address the physical memory 130. (VAs and PAs have a common offset from a base address, so that only the VPN needs to be converted into a corresponding physical page number (PPN).) The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Similar mappings are used in other architectures where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 220, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module in a kernel 600A, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

System Software Configurations in Virtualized Systems

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 1 illustrates a kernel 600A that serves as the system software for several VM/VMM pairs 200/300, . . . , 200N/300N. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration. The invention described below takes advantage of the ability to optimize a kernel as a platform for virtual computers.

A kernel-based virtualization system of the type illustrated in FIG. 1 is described in U.S. patent application Ser. No. 09/877,378 ("Computer Configuration for Resource Management in Systems Including a Virtual Machine"), which is incorporated here by reference. The main components of this system and aspects of their interaction are, however, outlined below.

At boot-up time, an existing operating system 420 may be at system level and the kernel 600A may not yet even be operational within the system. In such case, one of the functions of the OS 420 may be to make it possible to load the kernel 600A, after which the kernel runs on the native hardware 100 and manages system resources. In effect, the kernel, once loaded, displaces the OS 420. Thus, the kernel 600A may be viewed either as displacing the OS 420 from the system level and taking this place itself, or as residing at a "sub-system level." When interposed between the OS 420 and the hardware 100, the kernel 600A essentially turns the OS 420 into an "application," which has access to system resources only when allowed by the kernel 600A. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In such implementations, the kernel 600A preferably also includes a remote procedure call (RPC) mechanism to enable communication between, for example, the VMM 300 and any applications 430 installed to run on the COS 420.

Actions

In kernel-based systems such as the one illustrated in FIG. 1, there must be some way for the kernel 600A to communicate with the VMM 300. In general, the VMM 300 can call into the kernel 600A but the kernel cannot call directly into the VMM. The conventional technique for overcoming this is for the kernel to post "actions" (requests for the VMM to do something) on an action queue stored in memory 130. As part of the VMM code, the VMM looks at this queue periodically, and always after it returns from a kernel call and also before it resumes a VM. One typical action is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

Worlds

The kernel 600A handles not only the various VMM/VMs, but also any other applications running on the kernel, as well as the COS 420 and even the hardware CPU(s) 110, as entities that can be separately scheduled. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 1 within the kernel 600A as module 612. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 420; and 3) virtual machine worlds.

Worlds preferably run at the most-privileged level (for example, in a system with the Intel x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

Switching Worlds

When the world that is running on a particular CPU (which may be the only one) is preempted by or yields to another world, then a world switch has to occur. A world switch involves saving the context of the current world and restoring the context of the new world such that the new world can begin executing where it left off the last time that it was running.

The first part of the world switch procedure that is carried out by the kernel is that the current world's state is saved in a data structure that is stored in the kernel's data area. Assuming the common case of an underlying Intel x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding the details of this process is not necessary for understanding the present invention, however, so further discussion is omitted.

Memory Management in Kernel-Based System

The kernel 600A includes a memory management module 616 that manages all machine memory that is not allocated exclusively to the COS 420. When the kernel 600A is loaded, the information about the maximum amount of memory available on the machine is available to the kernel, as well as information about how much of it is being used by the COS. Part of the machine memory is used for the kernel 600A itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600A. Second, memory is used for the guest memory of the virtual machine. The memory management module may include any algorithms for dynamically allocating memory among the different VM's 200.

Interrupt and Exception Handling in Kernel-Based Systems

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600A therefore preferably also includes an interrupt/exception handler 655 that is able to intercept and handle (using a corresponding IDT in the conventional manner) interrupts and exceptions for all devices on the machine. When the VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt). One example of when the VMM preferably calls the kernel, which then forwards an interrupt to the COS, would be where the interrupt involves devices such as a mouse, which is typically controlled by the COS. The VMM may forward still other interrupts to the VM.

Device Access in Kernel-Based System

In the preferred embodiment of the invention, the kernel 600A is responsible for providing access to all devices on the physical machine. In addition to other modules that the designer may choose to load onto the system for access by the kernel, the kernel will therefore typically load conventional drivers as needed to control access to devices. Accordingly, FIG. 1 shows a module 610A containing loadable kernel modules and drivers. The kernel 600A may interface with the loadable modules and drivers in a conventional manner, using an application program interface (API) or similar interface.

SUMMARY OF THE INVENTION

A virtual computer system may be connected to a computer network by a plurality of network interface cards (NICs). The virtual computer system may comprise one or more virtual machines (VMs). The virtual computer system may further comprise a NIC manager, a VM manager and/or a resource manager, one or more of which, including possibly all or none of which, may be integrated into a kernel, which may be used to support the one or more VMs.

In particular, the NIC manager may be implemented either as a driver loaded into the kernel, or it may be integrated into the kernel. In either case, the NIC manager provides a NIC management solution, including NIC teaming functions, in the kernel of the virtual computer system, relieving each of the VMs from having to implement its own NIC teaming solution.

In one embodiment of the invention, VM-specific information may be used when making NIC management decisions, and/or NIC management information may be used when making VM management decisions and/or resource management decisions. VM-specific information and NIC management information may also be used together when making NIC management decisions, VM management decisions and/or resource management decisions.

VM-specific information may include which VMs are running in the virtual computer system, which VM is involved with a specific data transfer request, what the relative priorities are for the VMs in the virtual computer system, and/or the amount of network bandwidth that has been allocated to each of the VMs. NIC management information may include which NICs are available for routing a data transfer request, what the data loads are for the available NICs, and/or whether a failover or failback is occurring or has occurred relative to a NIC that is relevant to a NIC management decision.

NIC management decisions may include whether a failover or a failback is to be initiated, whether the routing of a data transfer request is to proceed or be discarded or delayed, and/or over which NIC a data transfer request is to be routed. VM management decisions may include whether a VM is to be suspended and/or migrated to a different physical computer system. Resource management decisions may include whether or not a VM has reached its allocation for a resource, such as a network bandwidth allocation, and/or which of multiple VMs should be given precedence when attempting to satisfy conflicting resource allocations.

Various algorithms may be used in making decisions under the invention, including possibly a first algorithm for deciding whether a data transfer request is to be routed, discarded or queued and a second algorithm for selecting a NIC over which data is to be routed. The possible algorithms that may be used for any decision under this invention may vary dramatically in complexity. An algorithm that may be used for selecting a NIC over which data is to be routed may be a load distribution algorithm, including possibly a load-balancing algorithm.

One general embodiment of the invention involves a method for transferring data from a VM in a virtual computer system to a computer network, where the virtual computer system comprises a first physical NIC and a second physical NIC for connecting to the computer network. The method comprises presenting a virtual NIC to the VM through which the VM may attempt to transfer data to the network, receiving a first set of data and a second set of data, both of which were sent by the VM to the virtual NIC for transference to the network, and, based on a load distribution algorithm, transferring the first set of data to the network through the first physical NIC and transferring the second set of data to the network through the second physical NIC. In a more specific embodiment of the invention, the load distribution algorithm is a load-balancing algorithm. In a still more specific embodiment, the load-balancing algorithm implements a round-robin function, while in another more specific embodiment, the load-balancing algorithm is based on a pending data transfer load for each of the first and second physical NICs. In three other embodiments, the load distribution algorithm is based on NIC management information, on VM-specific information, or on both NIC management information and VM-specific information.

Another general embodiment of the invention also involves a method for transferring data from a VM in a virtual computer system to a computer network, where the virtual computer system comprises a first physical NIC and a second physical NIC for connecting to the computer network. This method comprises presenting a virtual NIC to the VM through which the VM may attempt to transfer data to the network, receiving a plurality of data, which were sent by the VM to the virtual NIC for transference to the network, and transferring each of the plurality of data to the network through either the first physical NIC or the second physical NIC, wherein if the first physical NIC is not available for use, the data are transferred to the network over the second physical NIC, and if the second physical NIC is not available for use, the data are transferred to the network over the first physical NIC. In a more specific embodiment of the invention, if both the first physical NIC is available for use and the second physical NIC is available for use, the data are transferred to the network using a physical NIC that is determined according to a load distribution algorithm.

Another embodiment of the invention involves a method for managing network access between a virtual computer system and a computer network, where the virtual computer system comprises a plurality of VMs, and the virtual computer system is susceptible to possible adverse effects from a Denial of Service attack. The method comprises monitoring data that is transferred between the virtual computer system and the computer network for an indication of a possible Denial of Service attack, and, if an indication of a possible Denial of Service attack is detected, suspending one or more of the VMs, to reduce the risk of adverse effects on one or more other VMs.

Yet another embodiment of the invention involves a method for managing network access between a VM and a computer network, where the VM first executes in a first physical computer system having access to a first connection to the computer network, where the first connection is susceptible to possible adverse effects from a Denial of Service attack. The method comprises monitoring data that is transferred between the VM and the computer network for an indication of a possible Denial of Service attack, and, if an indication of a possible Denial of Service attack is detected, migrating the VM to a second physical computer system having access to a second connection to the computer network. In a more specific embodiment, the step of monitoring the data involves monitoring the quantity of network traffic that is transferred between the VM and the computer network.

In another more specific embodiment, the first and second physical computer systems are connected directly to the computer network.

Another embodiment of the invention involves a method for managing network access between a virtual computer system and a computer network, where the virtual computer system comprises a VM, and the virtual computer system is susceptible to possible adverse effects from a Denial of Service attack. The method comprises monitoring data that is transferred from the computer network to the virtual computer system for an indication of a possible Denial of Service attack, and, upon detecting data directed toward the VM, where the data indicates a possible Denial of Service attack, delaying the processing of the data by the VM to allow for one or more defensive measures against the possible Denial of Service attack. In more specific embodiments of the invention, the processing of the data by the VM is delayed by delaying an interruption to the VM regarding receipt of the data frame, by temporarily suspending the VM, or by delaying scheduling of the VM for CPU execution time. In another more specific embodiment, the one or more defensive measures comprises failing over from the use of a first set of one or more NICs to the use of a second set of one or more NICs.

DETAILED DESCRIPTION

The invention relates to managing data transfers between a virtual computer system and a computer network. The virtual computer system may be any of a wide variety of virtual computer systems implemented in any of a wide variety of physical computer systems. The computer network may be any of a wide variety of computer networks, including a combination of various types of networks. The physical computer system is connected to the computer network by two or more NICs, or a plurality of other devices for connecting a physical computer system to a computer network. The invention is described below in two different, specific embodiments, but it can also be implemented in a wide variety of other embodiments.

Figure 1:
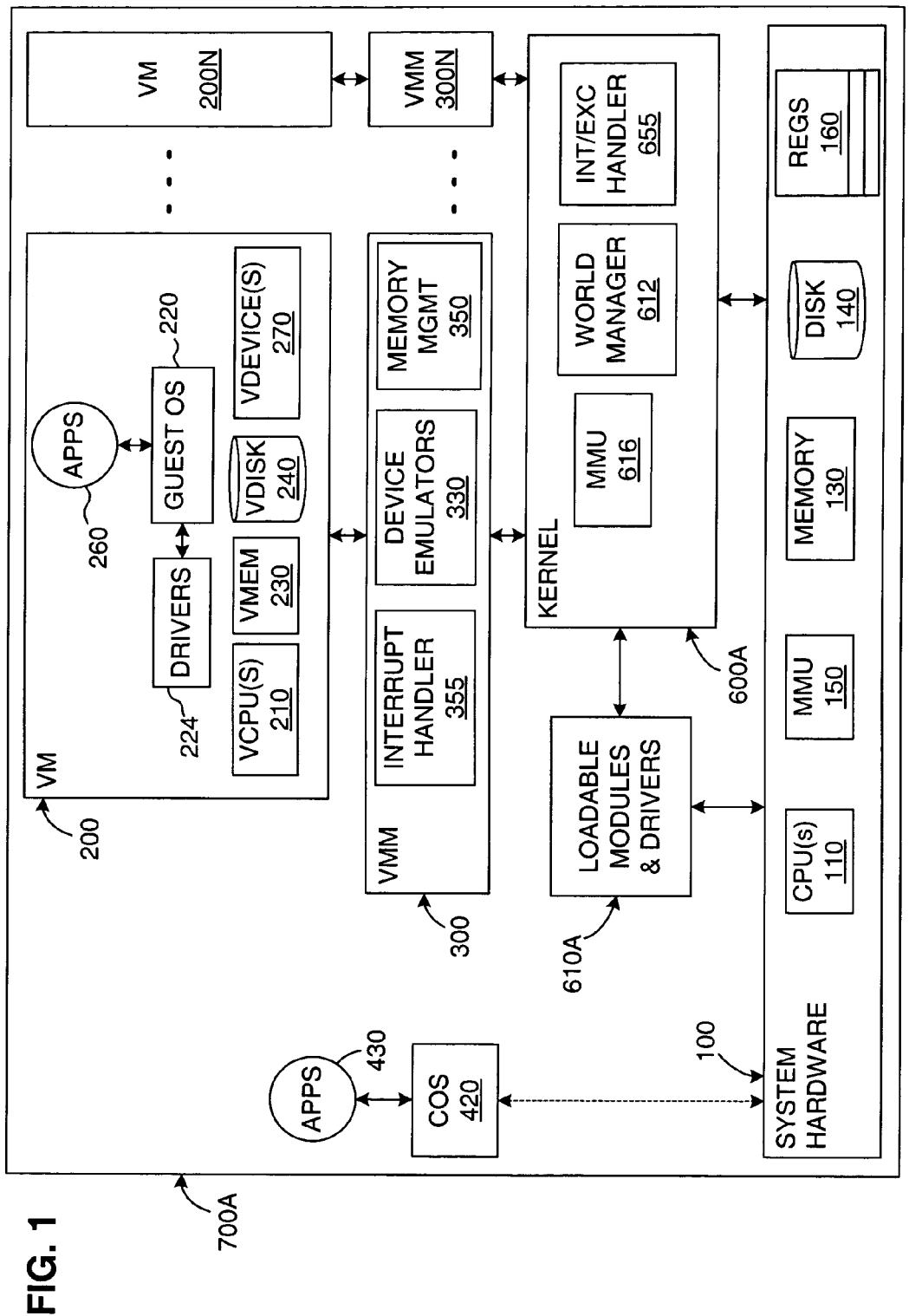
FIG. 1 illustrates the main components of a kernel-based, virtualized computer system.
Figure 2:
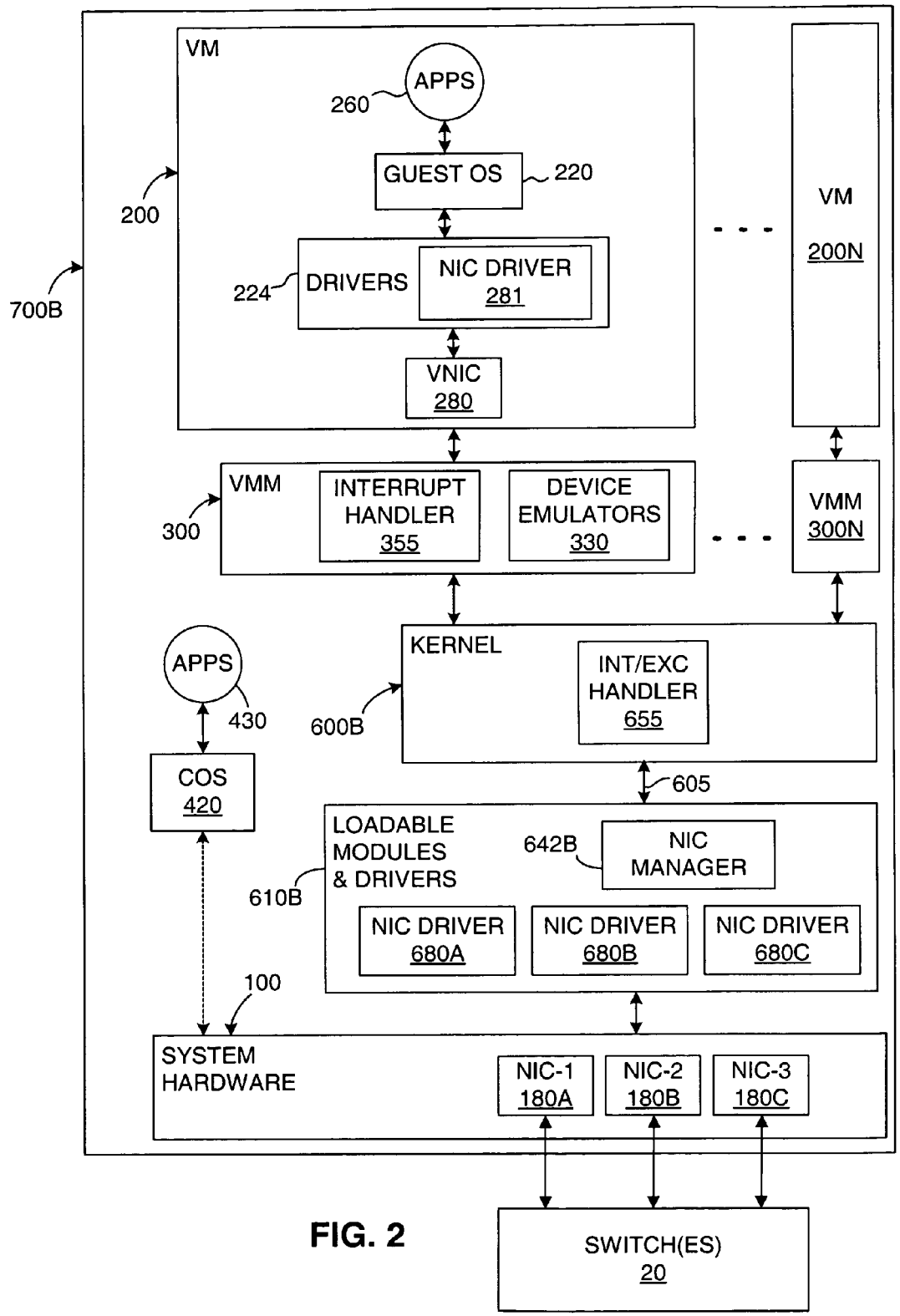
FIG. 2 illustrates a virtual computer system connected to a network switch by a plurality of NICs, in which a NIC manager is implemented as a driver or loadable module.

FIG. 2 illustrates a virtual computer system 700B connected to one or more switches 20. The one or more switches 20 will generally be referred to as a single switch 20 below for simplicity, however, any such reference to the switch 20 should be interpreted as an implication that there may be multiple switches 20. The switch 20 may be further connected to any of a wide variety of networks or combinations of multiple networks. However, to simplify implementing the NIC teaming functions described below, some embodiments of the invention may be limited so that only NICs that are connected to the same computer network, through the switch 20, may be bonded together. For example, the switch 20 may be connected to a common corporate network based on Ethernet technology. The corporate network may further be connected to other networks, such as the Internet. There are numerous books available on Ethernet technology, the Internet and a large variety of other networking and internetworking technologies. In this patent application, the word Ethernet is generally used to refer to any of the variations of Ethernet technology, including, in particular, the standard IEEE (Institute of Electrical and Electronics Engineers, Inc.) 802.3 interfaces operating at 10 megabits per second (Mbps), 100 Mbps and 1000 Mbps.

The system 700B comprises the system hardware 100, the COS 420 and the applications 430, a kernel 600B, a set of loadable modules and drivers 610B, and a plurality of VMMs 300 to 300N, supporting a plurality of VMs 200 to 200N, respectively. The system hardware 100 may constitute a conventional server computer based on the Intel IA-32 architecture, for example. The system hardware 100 includes a first NIC 180A, a second NIC 180B and a third NIC 180C. The NICs 180A, 180B and 180C may be standard network interface cards such as Intel PRO/100 Ethernet NICs, Intel PRO/1000 Gigabit Ethernet NICs, or various other NICs, including possibly a combination of different types of NICs from the same or from different manufacturers. In other embodiments of the invention, there may be as few as two NICs 180, or there may be any number of NICs greater than two. The invention may actually be implemented in a system with only one NIC, but many of the advantageous functions described below may not be realized in such a system, unless and until one or more additional NICs are added to the system. Illustrating three NICs in the examples here is arbitrary.

The kernel 600B is similar to the kernel 600A described above, including the interrupt/exception handler 655. The VMM 300 includes the interrupt handler 355 and the device emulators 330, as described above, and the VM 200 includes the guest OS 220, the drivers 224 and the applications 260, as described above.

FIG. 2 also shows four specific modules and drivers 610B, namely three NIC drivers 680A, 680B and 680C and a NIC manager 642B. The NIC driver 680A operates as a driver for the NIC 180A, the NIC driver 680B operates as a driver for the NIC 180B, and the NIC driver 680C operates as a driver for the NIC 180C. Each of the NIC drivers 680A, 680B and 680C may be substantially the same as a conventional, basic NIC driver for the corresponding NIC 180A, 180B or 180C. The NIC drivers 680A, 680B and 680C are specific to the particular types of NICs used as the NICs 180A, 180B and 180C, respectively. If two or more of the NICs are of the same type, then the corresponding NIC drivers may be separate instances of the same NIC driver. For example, for a Linux platform, if the NICs are all Intel PRO/100 Ethernet NICs, then the NIC drivers may all be separate instances of the e100 driver from Intel. As is well known, the NIC drivers control the NICs, and provide an interface with the NICs.

The NIC manager 642B may be an intermediate driver, substantially similar to many existing intermediate drivers for a conventional OS. The NIC manager 642B receives outgoing network data frames, from the VMs 200 to 200N for example, and forwards them to the NIC drivers 680A, 680B and 680C, for transmission onto the network by the respective NICs 180A, 180B and 180C. The NIC manager 642B also receives incoming network data frames from the NICs, through the NIC drivers, and routes them to the appropriate destinations, such as the VMs 200 to 200N, based on the layer 2 and/or layer 3 destination address(es) contained in the data frames. For example, for internet protocol (IP) data over an Ethernet network, the NIC manager 642B routes the data frames based on the medium access control (MAC) address and/or the IP address.

One of the device emulators 330 within the VMM 300 emulates a NIC to create a virtual NIC 280 for the VM 200, as illustrated in FIG. 2. The device emulator 330 preferably emulates the NIC in such a way that software within the VM 200, as well as a user of the VM 200, cannot tell that the virtual NIC 280 is not an actual, physical NIC. Techniques for emulating a NIC in this manner are well known in the art. The virtual NIC 280 may be a generic NIC or it may be a specific NIC, such as an Intel PRO/100 Ethernet NIC, for example. The NIC 280 is preferably a widely supported NIC, having drivers available for a large number and variety of OSs, such as the PCnet Lance Ethernet driver, from Advanced Micro Devices, Inc., which is built into all OSs that are common at this time. A NIC driver 281 that is appropriate for the virtual NIC 280 and the guest OS 220 is loaded as one of the drivers 224, if it is not already resident in the guest OS 220. The NIC driver 281 may be a standard NIC driver for use with the emulated virtual NIC 280, or it may be a custom NIC driver that is optimized for the virtual computer system 700B. In the same manner, the remaining VMs within the virtual computer system contain a device emulator that emulates a virtual NIC, which is controlled by a NIC driver that is loaded into the corresponding guest OS.

The NICs 180A, 180B and 180C may be configured into one or more bonds for NIC teaming purposes. For example, all three NICs may be configured into a single bond, or the first NIC 180A and the second NIC 180B may be configured into a bond and the third NIC 180C may be left out of the bond to operate independently of the other NICs. Also, each virtual NIC within the VMs 200 to 200N is then assigned to correspond with an individual (unbonded) physical NIC or with a bond of multiple NICs. To continue the above example, the virtual NIC 280 of the VM 200 may be assigned to correspond with the bond of the first NIC 180A and the second NIC 180B, while the virtual NIC of the VM 200N may be assigned to correspond with the third NIC 180C. Thus, the single virtual NIC 280 represents, or corresponds with, a pair of physical NICs 180A and 180B that are linked together to form a NIC teaming bond, while the virtual NIC for the VM 200N represents, or corresponds with, the remaining physical NIC 180C. An application 430 running on the COS 420 may provide a user interface to enable a system administrator to establish the NIC teaming configuration, for example.

In the currently preferred embodiments, each physical NIC can either be assigned to a single bond, or it can remain "unbonded," meaning simply that the NIC has not been assigned to a bond. A physical NIC cannot be assigned to multiple bonds. Also, each virtual NIC can be assigned either to a single unbonded physical NIC or to a single bond of multiple physical NICs. A virtual NIC cannot be assigned to multiple bonds of physical NICs. Also, a virtual NIC cannot be assigned to multiple physical NICs, except through an assignment to a single bond comprising multiple NICs. Also, a virtual NIC cannot be assigned to a bonded physical NIC, except through an assignment to the entire bond. However, each VM may have multiple virtual NICs, or just one virtual NIC as illustrated in FIG. 2. Also, multiple virtual NICs can be assigned to the same unbonded physical NIC or to the same bond of multiple physical NICs. Thus, for example, if the first NIC 180A and the second NIC 180B are configured together into a bond, and the third NIC 180C is left as an unbonded NIC, then some of the virtual NICs of the VMs 200 to 200N can be assigned to the bond of the first and second NICs, while the remaining virtual NICs of the VMs 200 to 200N are assigned to the unbonded third NIC, including the possibility that one or more of the VMs 200 to 200N may contain two virtual NICs, with one being assigned to the bond of the first and second NICs and the other being assigned to the unbonded third NIC.

To simplify implementing the invention, an embodiment may be configured such that a physical NIC cannot be added to a bond if it has been assigned as an unbonded NIC to a VM that is currently powered on and not suspended, and such that a physical NIC cannot be removed from a bond if the bond is assigned to a VM that is currently powered on and not suspended.

When an outgoing data frame is sent to the NIC driver 281, the data frame is forwarded to the NIC manager 642B. This forwarding of data frames can be accomplished in a variety of ways. For example, if the virtual NIC 280 emulated by the device emulator 330 is a standard NIC that provides direct memory access (DMA) capabilities, and the NIC driver 281 is a standard NIC driver for that particular type of NIC, then the NIC driver 281 will attempt to set up the NIC 280 to perform a DMA transfer of the data frame. The device emulator 330 will communicate with the NIC driver 281 and perform the transfer of data, making it appear to the NIC driver 281 that the virtual NIC 280 performed the DMA transfer, as expected. The emulator 330 will then provide the data frame to the NIC manager 642B for routing through one of the NIC drivers 680A, 680B and 680C and one of the NICs 180A, 180B and 180C and onto the network. For example, the emulator 330 may copy the data frame from a memory page that is controlled by the VM 200 to a memory page that is controlled by the kernel 600B, and which is accessible by the NIC manager 642B, and, more particularly, by the NIC drivers 680A, 680B and 680C. Similarly, for an incoming data frame, the device emulator 330 receives the data frame from the NIC manager 642B, places the data frame in an appropriate location in memory and generates an appropriate interrupt to the guest OS 220 to cause the NIC driver 281 to retrieve the data frame from memory. A person of skill in the art will understand how to emulate a virtual NIC 280 in this manner to facilitate the transfer of data frames between the NIC driver 281 and the NIC manager 642B. A person of skill in the art will also understand how to minimize the number of times that data frames are copied in transferring data between the NIC driver 281 and the switch 20, depending on the particular implementation. For example, for an outgoing data frame, it may be possible to set up the physical NICs 180A, 180B and 180C to perform a DMA transfer directly from the NIC driver 281, to avoid any unnecessary copying of the data.

In one embodiment of the invention, in which the virtual computer system 700B is connected to an Ethernet network, each of the virtual NICs within the VMs 200 to 200N has a MAC address that is unique, at least within the virtual computer system 700B, and preferably also within the local network to which the virtual computer system 700B is connected. Then, for example, any outgoing data frames from the VM 200 will contain the MAC address of the virtual NIC 280 in the source address field of the Ethernet frame, and any incoming data frames for the VM 200 will contain the same MAC address, or a broadcast or multicast address, in the destination address field of the Ethernet frame. Each of the NICs 180A, 180B and 180C may be placed in a promiscuous mode, which causes the NICs to receive all incoming data frames and forward them to the respective NIC drivers 680A, 680B, 680C, even if they don't contain the MAC address of the respective NIC. This ensures that the NIC manager 642B receives data frames containing the MAC address of each of the virtual NICs within the VMs 200 to 200N. The NIC manager 642B then routes incoming data frames to the appropriate VMs 200 to 200N, based on the MAC address that is contained in the destination field of the Ethernet frame. The NIC manager 642B is generally able to transmit data frames from the VMs 200 to 200N through the NICs 180A, 180B and 180C, using the MAC address of the respective virtual NIC within the source field of the Ethernet frame. In other words, the physical NICs 180A, 180B and 180C generally transmit outgoing data frames onto the network, even if the data frames do not contain the MAC address of the physical NICs in the source address field.

Incoming data frames may also be routed to other destinations within the virtual computer system 700B, such as to an application 430, as appropriate. Similarly, other entities within the virtual computer system 700B may generate outgoing data frames for transmission on the attached network. For example, on behalf of an application 430, a NIC driver within the COS 420 may insert the MAC address of one of the NICs 180A, 180B or 180C into the source field of the Ethernet header of an outgoing data frame. Then, responsive incoming data frames destined for the application 430 will contain the same MAC address, or a broadcast or multicast address, in the destination field of the Ethernet frame. Using these techniques, the NIC drivers within the guest OSs and the COS, the virtual NICs, the device emulators 330, the NIC manager 642B, the NIC drivers 680A, 680B and 680C, and the NICs 180A, 180B and 180C are able to transfer both incoming data frames and outgoing data frames between numerous different software entities within the virtual computer system 700B and numerous different software entities on the network.

The NIC manager 642B preferably provides failover and failback capabilities, using the multiple NICs 180A, 180B and 180C, according to the bonds established for NIC teaming and the assignment of virtual NICs to the bonded and unbonded physical NICs. For example, if the first NIC 180A and the second NIC 180B are bonded together and the bond is assigned to a VM, if the NIC manager 642B is sending data frames out using the first NIC 180A, and a failure occurs that prevents the use of the first NIC 180A, then the NIC manager 642B will stop sending data frames out over the first NIC 180A, and will begin sending data frames out over the second NIC 180B, instead. A failover such as this may also occur if the first NIC 180A is not available on a temporary basis, such as because of a lack of resources, such as a lack of empty NIC packet buffers. If the NIC manager 642B subsequently determines that the first NIC 180A is again available for use, then the NIC manager 642B may fail back and resume sending data frames over the first NIC 180A, instead of over the second NIC 180B. Preferably, each of the NIC drivers 680A, 680B and 680C can detect in a conventional manner whether its corresponding NIC 180A, 180B or 180C is available for use, and the NIC manager 642B can determine this information from the NIC drivers, also in a conventional manner. More specifically, the NIC drivers can preferably determine if there has been a failure related to the cable between the associated NIC and the switch 20, or within the associated NIC itself, that prevents the transfer of data between the associated NIC and the switch 20, or whether a resource limitation renders the associated NIC temporarily unavailable.

The NIC manager 642B also preferably provides one or more load distribution functions using the multiple NICs 180A, 180B and 180C, according to the NIC teaming bonds, if any. As used herein, a load distribution function means that different data frames are sent out over different bonded NICs, instead of using one NIC exclusively. A load-balancing function, as used herein, is a type of load distribution function, in which some attempt is made to distribute data transfer loads evenly over multiple bonded NICs. Various different types of load-balancing or other load distribution functions may be implemented. For example, in a "round-robin" approach, consecutive outgoing data frames are sent out over multiple NICs on an alternating or rotating basis, so that, for example, if all three NICs are configured into a single bond, a first data frame might be sent out over the first NIC 180A, a second data frame might be sent out over the second NIC 180B, a third data frame might be sent out over the third NIC 180C, a fourth data frame might be sent out over the first NIC 180A, and so on. Alternatively, the amount of data currently queued for transmission over each of the NICs may be estimated or precisely determined, and the next data frame may be placed on the queue of the NIC that currently has the lightest data load.

In one embodiment of the invention, a hash function is performed on the layer 2 and/or layer 3 destination address(es) of an outgoing data frame, and the frame is routed to a NIC, based on the outcome of the hash function. Thus, again supposing that all three NICs form a single bond, if the outcome of the hash falls within a first range, the frame is transmitted over the first NIC 180A, if the outcome falls within a second range, the frame is transmitted over the second NIC 180B, and, if the outcome falls within a third range, the frame is transmitted over the third NIC 180C. Thus, this embodiment implements a load distribution function based on the destination of an outgoing data frame. In another embodiment, a similar approach is used, except that the hash function is performed on the layer 2 and/or layer 3 source address(es) of the data frames, resulting in a load distribution function based on the source of the outgoing frames. In still another embodiment, a hash function is performed on both the layer 2 and/or layer 3 source address(es) and the layer 2 and/or layer 3 destination address(es) of the data frames, resulting in a load distribution function based on both the source and the destination of the outgoing frames.

In other embodiments of the invention, the routing of an outgoing data frame depends on the type of data frame. For example, in one embodiment, if the data frame is an IP packet, then a hash function is performed on the layer 3 destination address of the outgoing data frame, and the frame is routed to a NIC, based on the outcome of the hash function. If the data frame is anything other than an IP packet, then the data frame is routed on a round-robin basis over all of the available NICs in a bond.

Other embodiments may be optimized based on the type of data being transferred. For example, if a VM is involved in a TCP (transmission control protocol) session, the NIC manager 642B may ensure that all data packets from the session are transmitted over the same physical NIC so as not to increase the likelihood that the packets will arrive at the destination out of order. Getting the packets to arrive in the correct order more often leads to more efficient use of processing resources.

As another example of the operation of the NIC manager 642B, suppose that the first NIC 180A and the second NIC 180B are configured into a bond by a system administrator, while the third NIC 180C is left unbonded. Suppose further that the system administrator assigns the bond of the first and second NICs to correspond with the virtual NIC 280 of the VM 200, while the third NIC is assigned to correspond with the virtual NIC of the VM 200N. In this case, outgoing data frames sent by the VM 200 to the virtual NIC 280 are routed by the NIC manager 642B over either the first NIC 180A or the second NIC 180B, depending on the failover and failback status of the first and second NICs, and depending on a load distribution function. Meanwhile, outgoing data frames sent by the VM 200N to its virtual NIC are routed by the NIC manager 642B over the third NIC 180C.

The failover, failback and load distribution functions described above are similar to the NIC teaming functions provided by standard NIC teaming software solutions, such as the Linux bonding driver, the BASP software from Broadcom Corporation and the ANS software from Intel Corporation. Similarly, the NIC manager 642B may provide other NIC teaming functions that are provided in existing NIC teaming software. For example, the NIC manager 642B may support the IEEE 802.3ad link aggregation standard, both for static link aggregation and dynamic link aggregation. In this case, the NIC manager 642B may communicate with the switch(es) 20 through the NICs 180A, 180B and 180C to determine if one or more of the switches 20 also implements the IEEE 802.3ad specification. If so, then a partnership may be established between the one or more switches 20 and the corresponding NIC(s) 180A, 180B and 180C, also based on the bonding of the NICs, to provide the bidirectional NIC teaming functions described in the IEEE specification.

Providing these failover, failback and load distribution functions within a kernel or within a driver loaded into a kernel in a virtual computer system is particularly advantageous. The NIC manager 642B provides these functions to all of the VMs 200 to 200N. Meanwhile, the VMMs 300 to 300N present to each of the respective VMs 200 to 200N, for each network connection, a single virtualized NIC, which may be either a generalized NIC or a standard NIC for which a NIC driver is readily available. Each VM 200 to 200N needs only to have a single, basic NIC driver that can be easily obtained and implemented, or which may already be implemented in the guest OS. More specifically, the NIC drivers implemented in the VMs need not have any NIC teaming capabilities for the VM to realize the benefits of NIC teaming. The installation and configuration of the NIC drivers within the guest OS of each of the VMs 200 to 200N is quite simple, in stark contrast to the efforts required to install a NIC teaming solution in the guest OS of each of the VMs. The NIC teaming configuration may be established once within the NIC manager 642B and then the benefits of the NIC teaming functions may be enjoyed within each of the VMs 200 to 200N simply by installing a basic NIC driver.

An implementation such as this is beneficial in numerous different situations. For example, suppose that the VM 200 is running a relatively uncommon and under-supported guest OS, or a legacy OS, such as FreeBSD 3.8, for which there is no NIC teaming solution available for use with the NICs 180A, 180B and 180C. So long as a basic NIC driver 281 is available for use with the virtual NIC 280, the VM 200 can nonetheless benefit from failover, failback and load distribution functions using this invention, even while using an uncommon, under-supported or legacy guest OS.

Implementing these failover, failback and load distribution functions within the NIC manager 642B, instead of within the drivers 224 of the guest OS 220, also enhances the portability of the VMs because the VMs do not have to be customized for NIC teaming, based on the particular arrangement of NICs within the system hardware 100, including any possible NIC failures or corrections of previous NIC failures.

In another embodiment of this invention, suppose again that the virtual computer system 700B is connected to an Ethernet network. In this embodiment, the NIC manager 642B may determine the layer 2 addresses, or MAC addresses, associated with each of the virtual NICs of the VMs 200 to 200N. The NIC manager 642B may then determine which VM is the source of each outgoing data frame the NIC manager receives by comparing the contents of the source address field of the Ethernet frame with the layer 2 addresses of the VMs. The NIC manager 642B may then use this information about the source VM to decide how, or even if, the data frame should be routed through to the network. These decisions are described in greater detail below, with reference to FIGS. 4 and 5. Alternatively, the NIC manager 642B may determine the source VM of a data frame in other ways, depending on the particular implementation of the virtual computer system.

The modules and drivers 610B are analogous to and may be substantially the same as corresponding device drivers that are loaded into a conventional OS. Like OS device drivers, the modules and drivers 610B are not integrated into the kernel 600B. Instead, the modules and drivers 610B interface with the kernel 600B using an API that is similar to the APIs used between conventional OSs and device drivers, such as the Linux Device Driver Module API, for example. Accordingly, FIG. 2 shows an API 605 between the kernel 600B and the modules and drivers 610B. The information that is shared over such an API is typically quite limited, and the coordination between the software entities on opposite sides of the API is also quite limited.

For example, suppose a software entity within the VM 200 attempts to send a data frame to a destination on the computer network. The NIC manager 642B obtains the data frame and selects a NIC over which to transmit the frame to the network. Depending on the implementation, the NIC manager 642B may or may not know that the data frame originated from within the VM 200. The kernel 600B typically would not know which NIC was used for transmitting the data frame. In such an implementation, where the NIC manager 642B is implemented as a loadable module or driver 610B, the NIC manager 642B would not have much information about the VMs 200 to 200N or the VMMs 300 to 300N, and the kernel 600B would not have much information about the NICs 180A, 180B and 180C, or the routing of data frames over the NICs. In the next embodiment of this invention, on the other hand, a NIC manager is integrated, at least partially, into a kernel, and there is a significantly greater exchange of information between the NIC manager and the kernel. This increased integration and communication may provide more effective routing of data over a plurality of NICs within a virtual computer system, and it may improve the management of VMs by the kernel.

Figure 3:
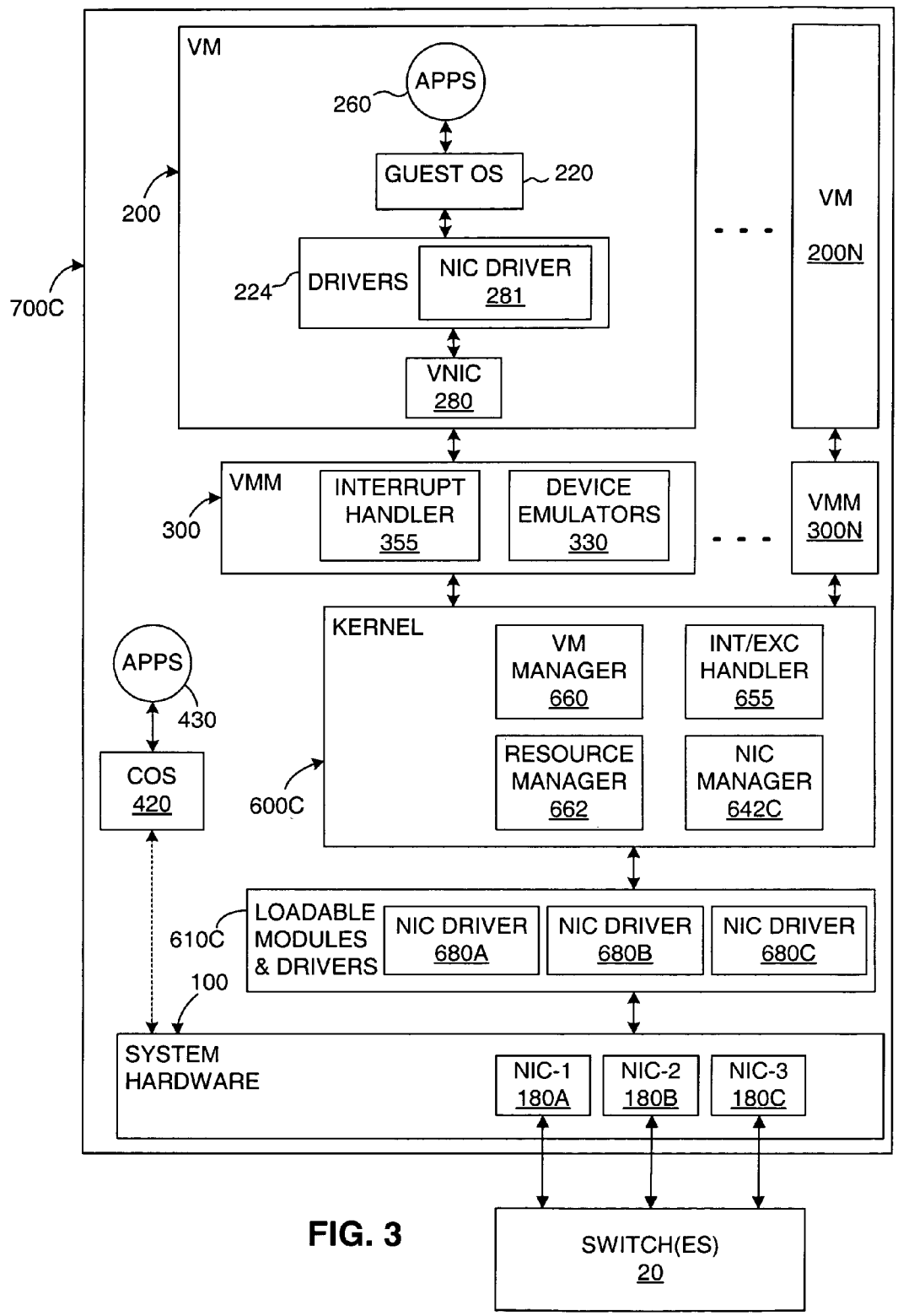
FIG. 3 illustrates another virtual computer system connected to a network switch by a plurality of NICs, in which a NIC manager is integrated into a kernel.

FIG. 3 illustrates a virtual computer system 700C, in which another embodiment of the invention is implemented. The computer system 700C is also connected to the switch 20 by the NICs 180A, 180B and 180C within the system hardware 100. The computer system also includes a different kernel 600C and a different set of loadable modules and drivers 610C. The kernel 600C supports the VMMs 300 to 300N, which support the VMs 200 to 200N, respectively. As further shown in FIG. 3, the VMM 300 includes the interrupt handler 355 and the device emulators 330, while the VM 200 includes the virtual NIC 280, the guest OS 220, the drivers 224, including the NIC driver 281, and the guest applications 260. The loadable modules and drivers 610C include the NIC drivers 680A, 680B and 680C. The computer system 700C also includes the COS 420 and the applications 430.

In this embodiment, a NIC manager 642C is integrated into the kernel 600C, instead of interfacing with the kernel 600C through an API. Many aspects of the first embodiment described above can be implemented in this second embodiment, and many aspects of this second embodiment can be implemented in the first embodiment. The kernel 600C also includes the interrupt/exception handler 655, a VM manager 660 and a resource manager 662. The VM manager 660 and the resource manager 662 may be combined into a single software unit or they may be implemented as separate units as illustrated in FIG. 3. The VM manager 660 and the resource manager 662 are illustrated and described as separate units herein simply because they have distinct functions. The VM manager 660 performs high-level functions related to the control and operation of the VMs 200 to 200N. For example, the VM manager 660 may initialize a new VM, suspend an active VM, terminate a VM or cause a VM to migrate to another physical computer system. The VM manager 660 may perform these actions in response to a variety of stimuli or conditions, such as in response to commands from a system administrator at a control console, in response to conditions within a VM or in response to other conditions within the virtual computer system 700C.

The resource manager 662 generally allocates system resources between the multiple VMs 200 to 200N, as well as between the other worlds within the virtual computer system. For example, the resource manager 662 schedules and manages access to the CPU(s), the memory, the network resources and any accessible data storage resources. The resource manager 662 may allow a system administrator to specify various levels of service that are to be provided to each of the VMs 200 to 200N for each of the system resources. For example, an application 430 running on the COS 420 may provide a user interface to a system administrator, enabling the system administrator to control numerous system parameters, including the levels of service of system resources for the multiple VMs 200 to 200N. The resource manager 662 then works with other units within the computer system 700C to provide the requested levels of service.

In many ways, the operation of the kernel 600C is similar to the operation of an OS. For example, just as a multitasking OS switches between multiple processes, the kernel 600C switches between multiple worlds, as described above. In addition, however, the kernel 600C provides other functions that are more specific to the virtual computing environment. For example, as mentioned above, the resource manager 662 may provide particular VMs with guaranteed levels of CPU time. Of course, the resource manager 662 and/or other units within the kernel 600C must have access to information about the VMs and/or the VMMs to implement such VM-specific functions. Regarding the allocation of CPU time, for example, the resource manager 662 must have access to information such as which VMs exist and how much CPU time has been guaranteed to each VM.

Similarly, integrating the NIC manager 642C into the kernel 600C provides the NIC manager 642C with access to information about the VMs and VMMs, enabling the NIC manager 642C to implement VM-specific functions as well. For example, suppose that the first NIC 180A and the second NIC 180B have been configured to form a bond. Suppose further that only the two VMs 200 and 200N have been assigned to use the bond of the first and second NICs. The NIC manager 642C can determine the existence of these two VMs 200 and 200N, and it can determine whether specific data frames were generated by the first VM 200 or the second VM 200N. The NIC manager 642C can then use this information in deciding over which NIC the data frames will be transmitted to the network. For example, the NIC manager 642C may use the first NIC 180A for all data frames generated by the first VM 200 and the second NIC 180B for all data frames generated by the second VM 200N. Selecting NICs in this manner provides greater isolation between the operation of the first VM 200 and the second VM 200N. Data traffic of the two VMs 200 and 200N are less likely to interfere with each other if they are transferred over different NICs. At the same time, however, if there is a failure related to one of the NICs 180A or 180B, a failover can be initiated and the network traffic of both VMs can be transferred over the NIC that remains available.

The NIC manager 642C may also receive additional information and work with other units within the kernel 600C to provide other VM-specific functions. For example, the NIC manager 642C may receive information from the resource manager 662 regarding the amount of network bandwidth to be allocated to each of the multiple VMs. The NIC manager 642C may then use this information to determine whether a data frame from a specific VM should be transmitted immediately or whether it should be discarded or placed on a queue for transmitting at a later time. In this way, the NIC manager can ensure that the specific VM does not exceed its allocated network bandwidth. Several such VM-specific functions are described below in connection with FIGS. 4 and 5.

Figure 4:
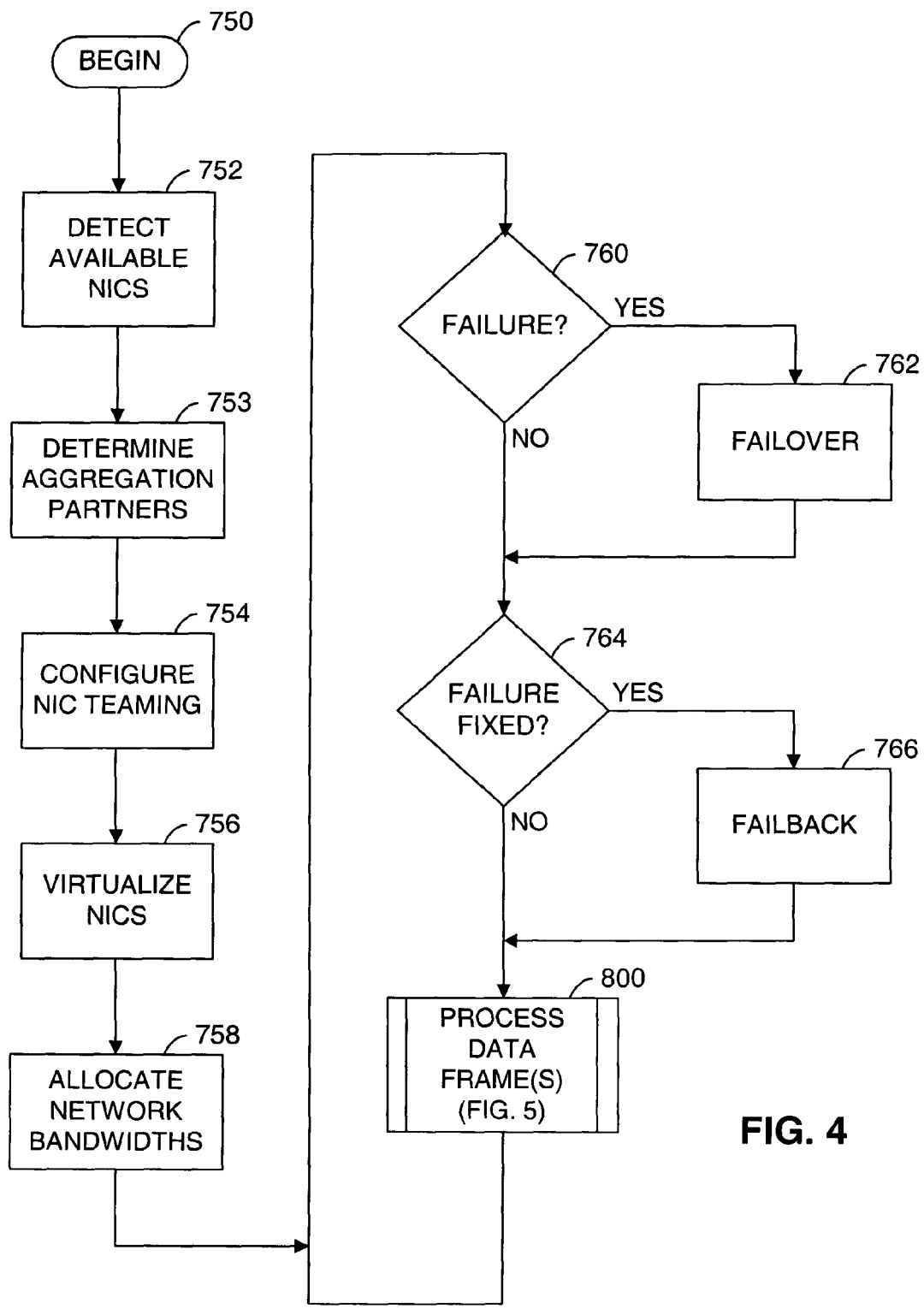
FIG. 4 illustrates a general method that is performed by the NIC manager and kernel of FIG. 3 to transfer data through the multiple NICs.

FIG. 4 is a flow chart illustrating a method that is performed by the NIC manager 642C, along with other units within the kernel 600C, to manage the transfer of outgoing data frames from the VMs 200 to 200N over the NICs 180A, 180B and 180C. The method begins at an initial step 750.

At a step 752, the NIC manager 642C detects all of the NICs that are installed in the system hardware 100. In the examples of FIGS. 2 and 3, the NIC manager 642C would detect the NICs 180A, 180B and 180C. The NIC manager 642C also determines which of the NICs 180A, 180B and 180C are available for transferring data frames. As described above, the NIC manager 642C may obtain information regarding the availability of the NICs from the corresponding NIC drivers 680A, 680B and 680C. For example, the NIC manager 642C may obtain information indicating that a failure has occurred in the NIC 180A, so that the NIC is not available. The determination of available NICs at the step 752 may take place at various times, including during system initialization and at various times during system operation, either automatically or in response to an administrator command, for example.

Next, at a step 753, the NIC manager 642C may determine whether one or more of the switch(es) 20 supports a bidirectional link aggregation capability, such as the IEEE 802.3ad standard. If the NIC manager 642C and one or more of the switch(es) 20 support a common link aggregation capability, then a partnership may be established for bidirectional link aggregation. If there is no common link aggregation capability, then the NIC manager 642C nonetheless provides failover, failback and load distribution functions for outgoing data frames, and it is up to the switch(es) 20 as to whether any such functions are provided for incoming data frames.

Next, at a step 754, the NIC manager 642C configures for NIC teaming. As described above for the embodiment of FIG. 2, a system administrator may select multiple NICs to be joined into one or more bonds. Alternatively, the NIC manager 642C may automatically configure one or more bonds of NICs, based on a predetermined algorithm, for example. As an example, suppose that the first NIC 180A is connected to a first switch 20A and the second and third NICs 180B and 180C are connected to a second switch 20B. Suppose further that the NIC manager 642C and the switches 20A and 20B support the IEEE 802.3ad standard. In this case, the first NIC and the first switch may form a first partnership, while the second and third NICs may form a bond and they may form a second partnership with the second switch. Both outgoing data frames and incoming data frames are then routed according to this configuration, and according to the IEEE 802.3ad standard.

At a step 756, the device emulator 330 emulates a virtual NIC for one or more of the VMs 200 to 200N, as described above. For example, the device emulator 330 emulates the virtual NIC 280 for the VM 200.

At a step 758, the resource manager 662 may specify or determine an allocation of network bandwidth for each of the multiple VMs. Again, a system administrator may specify the allocation of resources. For example, each of the VMs 200 to 200N may be allocated a proportional share of the network bandwidth available through the physical NIC(s) to which the respective VMs were assigned. For example, a first VM and a second VM may be assigned equal shares of the network bandwidth provided by a bonding of the first and second NICs 180A and 180B, while a third VM may be assigned twice as much as a fourth VM of the network bandwidth of the third NIC 180C. Also, the resource manager 662 may guarantee one or more network bandwidth settings to the respective VM(s).

Network bandwidth may be allocated according to a number of different sharing algorithms. In one embodiment, network traffic shaping filters are employed. A shaping filter may be applied to one or more of the VMs 200 to 200N, perhaps by a system administrator, for example. For each VM, the system administrator may specify a maximum average bandwidth in bits per second, a peak bandwidth in bits per second, a maximum burst size in bytes and an optional peak bandwidth enforcement period in milliseconds. For each VM to which a filter is applied, the NIC manager 642C, along with other units within the kernel 600C, will generally not permit the VM to exceed the parameters specified in the respective filter.

In another embodiment, the resource manager 662 implements a proportional-share approach to network bandwidth allocation. Under this approach, each VM is allocated a number of shares of network bandwidth, between a minimum and a maximum allowable number of shares, with the minimum possibly being zero. The shares apply to the particular set of bonded NICs or the single, unbonded NIC to which the VM has been assigned. The network bandwidth provided to each VM is then equal to the number of shares allocated to the VM divided by the total number of shares allocated for the bond or the unbonded NIC to all of the VMs that are currently running, if all of the running VMs are actively sending data frames.

Suppose, for example that three VMs are assigned to the same bond of NICs, and that all three VMs are currently running and actively issuing data frames. Suppose that a first and second VM are each allocated 2000 shares of network bandwidth and a third VM is allocated 1000 shares of network bandwidth, so that the total number of shares of all running VMs is 5000 (2000+2000+1000). In this example, the first VM is entitled to forty percent of the network bandwidth for the bond (2000÷5000), the second VM is also entitled to forty percent of the network bandwidth for the bond (2000÷5000), and the third VM is entitled to the remaining twenty percent of the network bandwidth for the bond (1000÷5000).

Thus, suppose that this bond of NICs comprises a pair of 1000 Mbps (one gigabit per second) Ethernet cards. The network bandwidth provided by these two NICs will typically be a little less than 2000 Mbps. In the above example, the first and second VMs will each be entitled to about 800 Mbps of network bandwidth, while the third VM will be entitled to about 400 Mbps.

Suppose next that the first VM stops running for some reason. Now, there are only 3000 shares of network bandwidth allocated to the running VMs, and the second VM is entitled to 67 percent of the network bandwidth (2000÷3000), while the third VM is entitled to the remaining 33 percent of the network bandwidth (1000÷3000).

If a VM is not using its entire allocation of network bandwidth for a bond or unbonded NIC, then only the shares for that VM corresponding to the used bandwidth count toward the total number of shares allocated for the bond or unbonded NIC. Thus, a distinction is drawn between "used" network bandwidth and "allocated" network bandwidth. In the example above, where the first and second VMs are allocated 2000 shares and the third VM is allocated 1000 shares, suppose that the first VM uses only twenty percent of the total bandwidth, even though it is entitled to use up to forty percent of the bandwidth. In this case, the remaining eighty percent of the network bandwidth is divided between the second VM and the third VM according to their relative allocations. The second VM is entitled to use about 53.3 percent of the network bandwidth, while the third VM is entitled to use about 26.7 percent of the network bandwidth, because the second VM has been allocated twice as many shares as the third VM.

The proportional amount of network bandwidth used by each VM may be determined by tracking virtual times and network bandwidth consumption units. Virtual times and/or network bandwidth consumption units are actually calculated or updated each time a new data frame is processed, such as at a step 800 of FIG. 4, or, more precisely, at a step 808 of FIG. 5. In one embodiment, each data frame sent by a VM consumes a single consumption unit. A local virtual time is tracked for each VM. A local virtual time represents a VM's consumption of network bandwidth relative to its allocation of bandwidth. All local virtual times are initially set to zero. Then, when a VM sends a data frame, its local virtual time for network access is increased by one divided by the number of shares of network bandwidth allocated to the VM, so that changes in local virtual time are inversely proportional to the number of shares allocated to a VM. As a result, local virtual times will increase more quickly for VMs that have lower share allocations. When multiple VMs are attempting to send data frames over the same bond or unbonded NIC, the VMs with lower local virtual times for network access will generally be given priority over other VMs that are attempting to access the same bond or unbonded NIC, and that have higher local virtual times.

The local virtual times may also be monitored to ensure that they fall within specified ranges over selected time intervals, to ensure that no VM may monopolize network bandwidth or is locked out of using the network for an extended period of time due to previous usage patterns. For example, if a VM has not used the network for a long time, its local virtual time may be much lower than the local virtual times of any of the other VMs. If the VM then has a large amount of data to transfer over the network, it will begin issuing data frames and might be able to exclude one or more other VMs from using the network while its local virtual time gradually increases. Instead, however, the number of consumption units that the newly active VM will be permitted to use over any particular time interval will be limited to a certain maximum value. This limitation ensures that other VMs will still have some access to the network, even if the newly active VM's local virtual time remains the lowest. Similarly, a VM will be allowed some minimum network bandwidth during each time interval, even if its local virtual time is higher than any other VM attempting to use the bond or unbonded NIC.

Each of the values for the network bandwidth sharing algorithm, including the definition of a consumption unit, the definition of a local virtual time, the time periods over which local virtual times are monitored and the range of permitted local virtual time values, may be set by a system administrator, they may be pre-defined, or they may be set according to some static or dynamic algorithm.

Again, a system administrator may be allowed to specify the number of shares that are allocated to each of the VMs in the computer system 700C for network access. Then, based on the relative shares of the VMs that are assigned to a given bond or unbonded NIC and that are running at a given time, and the actual usage of network bandwidth by each of the VMs, the resource manager 662 determines for each bond or unbonded NIC, the percentage of network bandwidth to which each VM is entitled. Other techniques may also be used to allocate network bandwidth between the multiple VMs, including priority-based scheduling and partitioning approaches. Also, the implementation of the different allocation techniques may vary widely. For example, in a share-based allocation technique, other methods may be used to determine when a VM has reached its allocation of network bandwidth, other than tracking consumption units and local virtual times, as described above.

The steps 753, 754, 756 and 758 may be performed at various times as well, like the step 752, as described above. For example, the steps 753, 754, 756 and 758 may be performed during system initialization and at various times during system operation, either automatically or in response to an administrator command. Each of the steps 752, 753, 754, 756 and 758 may be performed individually, or in combination with one or more of the other steps, at different times, as appropriate. For example, the NIC manager 642C may automatically perform the step 752 at various times to determine if there are any changes related to the availability of NICs. If a system administrator installs an additional NIC into the system hardware 100, then the NIC manager 642C will detect the new hardware the next time it performs the step 752, and the NIC manager 642C will respond accordingly. The NIC manager 642C and/or the system administrator may then initiate one or more of the other steps 753, 754, 756 and 758 to configure the new NIC within the virtual computer system.

After the step 758, the method of FIG. 4 proceeds to a step 760. At the step 760, the NIC manager 642C determines whether there has been any failure, or if there is any resource limitation, that prevents the transfer of data across any of the NICs identified as available at the step 752. As described above, in a preferred embodiment of the invention, the NIC manager 642C can determine if there has been a failure at any of the NICs 180A, 180B or 180C, or at any of the cables connecting the NICs to the switch 20. The NIC manager 642C makes these determinations by reference to the NIC drivers 680A, 680B and 680C, as described above.

If there is a failure or resource limitation that prevents the transfer of data across any of the NICs identified at the step 752, then the method of FIG. 4 proceeds to a step 762. Otherwise, the method advances to a step 764. At the step 762, the NIC manager 642C fails over from the NIC that is no longer available to another NIC within the same bond, if possible. More specifically, the NIC that has failed is marked accordingly, so that the failed NIC will no longer be used for data transfers. Later, when the NIC manager 642C processes a requested data transfer, the NIC manager 642C will route the data to an alternate NIC that is not affected by the failure, instead of routing the data to the failed NIC. After the failover or other action is performed at the step 762, the method of FIG. 4 proceeds to the step 764.

At the step 764, the NIC manager 642C determines whether any previous failure for which a failover was performed has been corrected. This step may be performed at various times, either automatically or manually, or both. Thus, a system administrator may replace a failed NIC, for example, and then manually initiate the step 764. Alternatively, the NIC manager 642C may automatically perform the step 764 from time to time, until it detects that a failure has been corrected. As one example, the NIC manager may automatically perform the step 764 on a periodic basis, with the time period depending on the particular implementation of the invention and the particular configuration of the computer system. As another example, the NIC manager may automatically perform the step 764 each time a data frame is ready to be transferred to the network. In some embodiments, the NIC manager 642C is able to determine the general severity of the NIC failure and perform the step 764 accordingly. If the NIC manager determines that a NIC is temporarily unavailable due to a resource limitation, then the step 764 may be performed each time a data frame is processed, while if the NIC manager determines that a more permanent failure has occurred, such as a hardware failure or a disconnected cable, the step 764 may be performed less frequently, possibly depending on the severity of the failure. The frequency at which the step 764 is performed and the criteria under which the step is performed may vary widely depending on the particular implementation and configuration involved. Also, a system administrator may be able to configure parameters to specify the conditions under which the step 764 is performed. Tests may also be performed by a system designer and/or a system administrator to optimize the timing of performing the step 764, based on overall network throughput and latency considerations, as well as other system resource considerations, such as CPU utilization. Corrected failures are determined in substantially the same manner as described above at the step 760 for determining failures.

If a failure has been corrected, then the method of FIG. 4 proceeds to a step 766. Otherwise, the method advances to the step 800. At the step 766, the NIC manager 642C marks the NIC for which the failure has been corrected as being functional, instead of being failed. The NIC manager 642C may also take other appropriate actions to resume using the affected NIC for subsequent data transfer requests. For example, the NIC manager 642C may fail back to using the NIC that was used before the failover occurred. As an alternative, however, the failback may not occur immediately. Instead, the NIC manager 642C may wait for some other occurrence, such as a particular load-balancing condition, before resuming the use of a NIC for which a failover has occurred. After the step 766, the method of FIG. 4 proceeds to the step 800.

Figure 5:
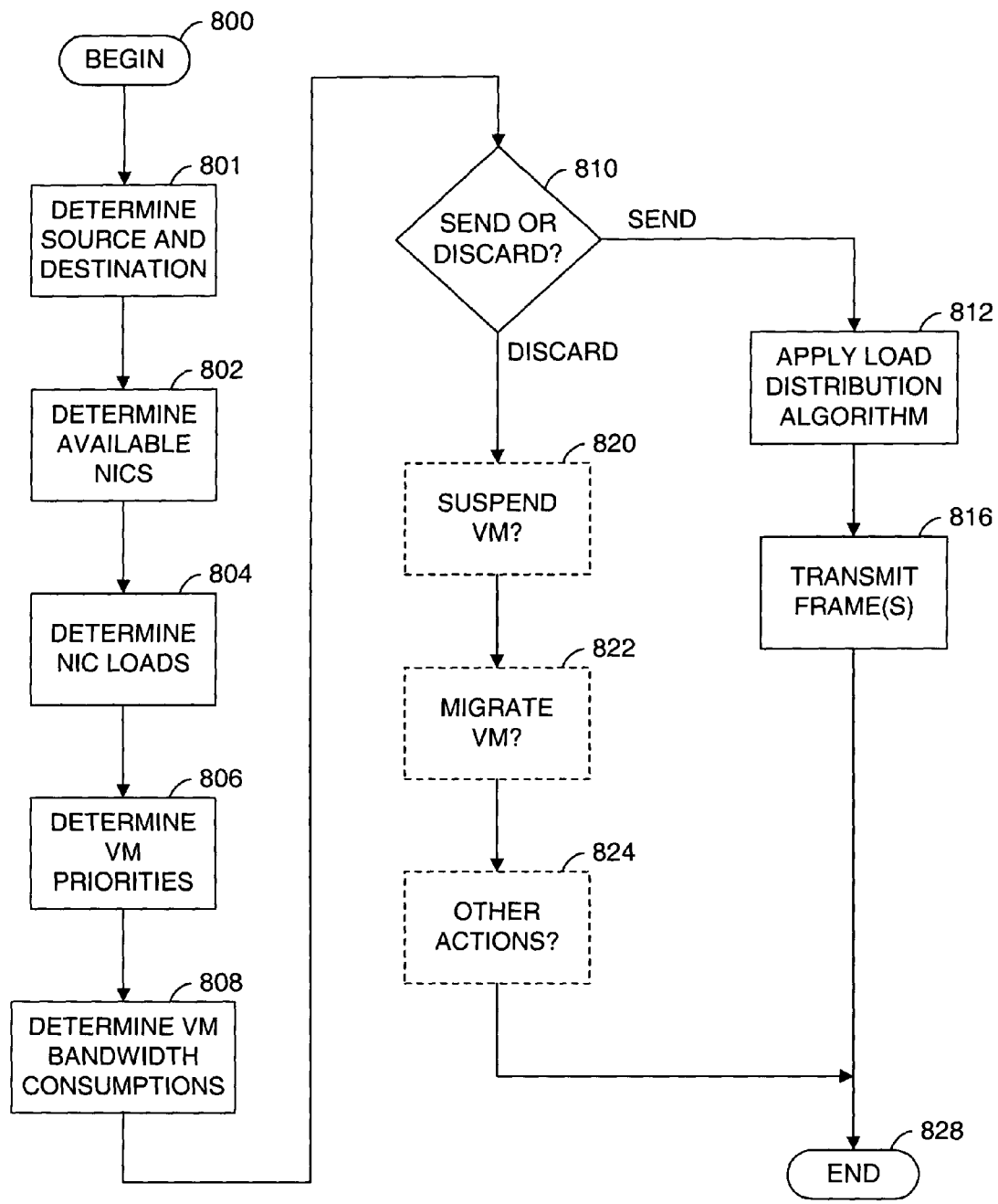
FIG. 5 illustrates a method that is performed by the NIC manager and kernel of FIG. 3 in response to a requested data transfer.

At the step 800, the NIC manager 642C processes network data transfer requests from within the virtual computer system, including possibly selecting between multiple NICs to determine the NIC over which the data frames are transferred. At the step 800, the NIC manager 642C performs a method that is illustrated in FIG. 5, which is described below. After the step 800, the method of FIG. 4 returns to the step 760.

The general method of FIG. 4 may be implemented in many different ways. The sequence of steps may be rearranged in many different ways and may be combined in different ways. In very general terms, the steps 752, 753, 754, 756 and 758 are preferably performed during a system initialization, as well as at varying times throughout the operation of the system, while the steps 760, 762, 764 and 766 are performed after initialization, at varying times throughout the operation of the system, and the step 800 is performed whenever a data transfer is requested.

When an outgoing network data transfer is requested, for example by one of the VMs 200 to 200N, the method of FIG.

5 is performed. The method begins at a step 800. At a step 801, the NIC manager 642C determines the layer 2 and/or layer 3 source and destination addresses for the requested data transfer. The NIC manager 642C also preferably determines which entity within the virtual computer system is the source of the requested data transfer. For example, the NIC manager 642C may determine that the source is the VM 200. This information is readily available to the NIC manager 642C, within the kernel 600C. Alternatively, the information may be readily determined by comparing the layer 2 source address of the outgoing data frame with the layer 2 addresses of the virtual NICs for each of the VMs 200 to 200N.

Next, the method of FIG. 5 proceeds to a step 802. At the step 802, the NIC manager 642C determines the NIC(s) over which the data frame may be transferred. This set of possible NICs is dependent on the bond or unbonded NIC to which the source of the data frame has been assigned. For example, as described above, the NIC manager 642C may have determined that the NICs 180A, 180B and 180C were all assigned to the bond to which the data frame applies. Suppose further, however, that a failure was determined at the step 760 of FIG. 4 related to the NIC 180A, and a failover was performed at the step 762 to use the NICs 180B and 180C, and not the NIC 180A. In this case, the NIC manager 642C determines at the step 802 that the NICs available for transferring the data frame are the NICs 180B and 180C. If there had been no failure related to the NIC 180A, or if the failure had been corrected, then the available NICs would be the NICs 180A, 180B and 180C.

Next, at a step 804, the NIC manager 642C determines the relative loads of data currently pending to be transferred over each of the NICs determined at the step 802. The path loads may be determined in a variety of ways, depending on the system configuration. For example, the NIC drivers 680A, 680B and 680C may keep track of the amount of pending data to be transferred over each respective NIC. In this case, the NIC manager 642C may obtain this information directly from the NIC drivers 680A, 680B and 680C.

The information collected in the steps 801, 802 and 804 is pertinent to decisions that must be made related to selecting NICs over which to transfer data frames. This information is referred to herein as "NIC management information." In this application, the phrase "NIC management" should be interpreted more broadly than the phrase "NIC teaming." NIC management information may also include other information related to selecting a NIC over which to transfer a data frame, depending on the specific implementation.

Next, at a step 806, the NIC manager 642C determines priorities that have been assigned to each of the VMs 200 to 200N. For example, a system administrator may assign priorities to the different VMs using a console application, as described above. Alternatively, priorities may be assigned automatically, based on the functions performed by each of the VMs, for example. The priorities may apply to all system resources in general, or they may apply to specific system resources. For example, one VM may be assigned a higher priority with respect to network bandwidth, while another VM is assigned a higher priority with respect to CPU time. The priorities may be designated by various means, such as by using numbers from 0 to 10. Depending on the relative priorities of the VMs that are competing for system resources, the NIC manager 642C and other units within the kernel 600C make different decisions and take different actions related to managing the VMs and their access to system resources.

Next, at the step 808, the NIC manager 642C, in effect, determines the amount of network bandwidth for the bond or unbonded NIC that has been consumed by the VM requesting the data transfer relative to the amount of network bandwidth that has been allocated to the VM. The NIC manager 642C may also, in effect, determine the amount of network bandwidth that has been consumed by each of the other VMs that has been assigned to the bond or onbonded NIC relative to the amount of network bandwidth that has been allocated to each of the other VMs. For example, referring to the method of tracking virtual times and network bandwidth consumption units in the proportional-share approach described above, the NIC manager 642C may calculate or update the virtual times and/or consumption units at this point and compare these values for all the VMs assigned to the bond or unbonded NIC. The NIC manager 642C also notes any guaranteed network bandwidth allocations. Also, one or more of the VMs may be assigned specific minimum absolute bandwidth values. If possible, the NIC manager 642C will provide each of these one or more VMs with its specified minimum absolute bandwidth, regardless of the relative priorities of the VMs or the network bandwidth shares allocated to each VM.

The information collected in the steps 806 and 808 relates specifically to the VMs within the virtual computer system 700C, and is thus referred to as "VM-specific information." VM-specific information may also include other information that is specific to the VMs within a virtual computer system, depending on the specific implementation. Such VM-specific information has not been made available to any NIC teaming solutions in prior art systems. However, in this embodiment of the invention, the NIC manager 642C does have access to this VM-specific information, and the NIC manager 642C uses this information to make better decisions regarding the NIC over which a data frame will be routed.

Returning now to the method of FIG. 5, at a step 810, the NIC manager 642C applies an algorithm to determine whether the data frame should be transferred onto the network, or whether the data should simply be discarded. As another alternative, the data frame could be placed in a queue for transferring at a later time. A wide variety of algorithms may be applied in making this decision, depending on a number of different factors. In particular, a network bandwidth sharing algorithm may be implemented, such as the traffic shaping filter approach or the proportional-share approach described above. The algorithm may use some or all of the information collected during the steps 801, 802, 804, 806 and 808, along with other information not specifically mentioned above.

For example, suppose that a first VM within the virtual computer system generates a data frame and attempts to send it to a destination on the computer network. Suppose further that the first VM has been assigned to a bond of NICs comprising all three NICs 180A, 180B and 180C. Suppose further, however, that several other VMs have been assigned to the same bond of NICs, and that there is a relatively large backlog of outgoing network data queued for transmission onto the network. Finally, suppose further that a second VM is also actively transmitting data across the network using the same bond of NICs and that the second VM has been assigned a higher priority than the first VM. In this situation, the NIC manager 642C may decide to discard the data frame from the first VM, instead of sending it onto the network. Also, if the first VM has reached its allocation for network bandwidth, then the data frame may also be discarded or queued. On the other hand, if the backlog of outgoing network data transfers is not too large and if the first VM has not reached its allocation of network bandwidth, then the data frame may be immediately forwarded to one of the NICs 180A, 180B or 180C for transmission onto the network.

Under this invention, the algorithm of the step 810 preferably uses NIC management information, VM-specific information, or both, in making the decision as to whether a data frame should be sent immediately to a NIC, queued for later transmission or discarded. For example, suppose now that the first NIC 180A and the second NIC 180B are assigned to a bond and that the third NIC 180C is left unbonded. Suppose further that the first and second NICs provide the same network bandwidth as each other. Suppose further that the VM 200 is actively transmitting data to the network. Suppose further that the VM 200 has been allocated a twenty percent share of the network bandwidth provided by the bond, but the VM has thus far only used about fifteen percent of the bandwidth. Now suppose that a failure occurs that prevents the use of the first NIC 180A, and then the VM 200 issues another data frame. With the failure of one of the two NICs, the network bandwidth provided by the bond is suddenly cut in half. Now the usage of network bandwidth by the VM 200 represents about thirty percent of the reduced bandwidth available after the failure. The usage by the VM 200 now exceeds the VM's share of network bandwidth allocation. In this invention, the NIC manager 642C takes the NIC management information of the NIC failure into account in determining whether the VM 200 has reached its allocation of network bandwidth, which is a VM-specific decision. As a result, under these circumstances, the NIC manager 642C will determine that the network bandwidth allocation has been reached, and the data transfer request will preferably be discarded or queued, instead of being routed immediately.

In addition, the NIC manager 642C may consider the priorities assigned to each of the VMs that is attempting to use the same bond, in deciding how to respond to the requested data transfer. In particular, if there is another active VM that has a higher priority or that has been guaranteed a specific network bandwidth, the NIC manager 642C may decide to discard or queue the request. Thus, in this situation, the NIC manager 642C may consider both VM-specific information (e.g. network bandwidth allocations and priority assignments) and NIC management information (e.g. the NIC failure and the available NICs) at the same time, in making the decision whether a data requested transfer should be performed.

By discarding or queuing data transfer requests of low priority VMs upon NIC failures or upon other conditions leading to a network bandwidth bottleneck, the higher priority VMs are more likely to receive the network bandwidth they need, even under extreme circumstances. This aspect of the invention is particularly advantageous in virtual computer systems in which both critical applications and less important applications are executed. The VMs that execute the critical applications may be assigned a higher priority level, while the less important applications are assigned a lower priority level. Whenever a data bandwidth bottleneck occurs, the NIC manager 642C can automatically give precedence to the requests of the critical applications and defer the servicing of the less important applications. The critical applications receive the system resources they need, even under extreme circumstances. Meanwhile, under normal operating conditions, when there are adequate system resources to satisfy the critical applications and the less important applications, the less important applications are permitted to execute, which results in better utilization of all the resources of the entire server computer system.

A wide variety of algorithms may be used for the decision of the step 810, and a wide variety of criteria may be used in making the decision. A person of skill in the art will be able to implement a suitable algorithm, depending on the configuration of the particular system in which the invention is to be implemented, along with the desired functionality and characteristics of the system. The algorithm may be simple or it may be complex, depending on system requirements. Also, the algorithm may be entirely predefined, it may be partially or completely configurable by a system administrator, or it may be determined automatically, in whole or in part, based on various system parameters, such as the number of VMs, the relative priorities of the VMs, the functions performed by the VMs, the capabilities of the NICs 180A, 180B and 180C, and various other parameters.

If a decision is made at the step 810 to queue the data transfer request, then the request will be routed at a later time, in a conventional manner, based on the normal scheduling of the kernel 600C and the availability of system resources. On the other hand, if a decision is made to transmit the data frame, the method of FIG. 5 proceeds to a step 812.

At the step 812, a load distribution algorithm is applied to select a NIC over which to transfer the data frame. This algorithm may be a simple load-balancing algorithm, such as one of the algorithms described above. For example, the algorithm may select the NIC over which the least amount of data is pending for transfer. Alternatively, the algorithm may perform a round-robin function, and alternate or rotate between all of the available NICs. However, in the preferred embodiment, the algorithm is designed specifically for a virtual machine environment, using VM-specific information. For example, the NIC selected by the algorithm may depend on the particular VM involved in the data transfer, or it may depend on one or more characteristics of the VM or parameters associated with the VM, such as the priority assigned to the VM. For example, the algorithm could select a separate NIC for the data transfers of each of the different VMs in the system, as described above. For example, for data transfers involving a bond of the first NIC 180A and the second NIC 180B, data transfers related to the VM 200 could be transferred over the first NIC 180A, while data transfers related to the VM 200N could be transferred over the second NIC 180B. Various other algorithms are also possible, using various other criteria. For example, the data transfers for a lower priority VM may be isolated to a specific NIC, while the data transfers for a higher priority VM may be transferred over whichever NIC has the lowest amount of pending data to be transferred. A system administrator may design some or all of the functionality of the algorithm, or the administrator may specify certain parameters upon which the algorithm operates. Alternatively, the entire algorithm may be set automatically, based on the system configuration. Next, at a step 816, the NIC manager 642C transfers the data frame over the selected NIC in a conventional manner, using the corresponding NIC driver 680A, 680B or 680C.

If a decision is made at the step 810 that a data transfer request will be discarded or queued, instead of being transferred immediately, then the next step to be performed varies, depending on the particular embodiment of the invention. FIG. 5 shows a step 820, a step 822 and a step 824 as being optional, by using dashed lines. Each of these steps may be implemented or not, independently of the others, depending on the particular embodiment. The following description assumes that all of the steps 820, 822 and 824 are implemented, although any of them or all of them may be omitted.

At the step 820, the NIC manager 642C and/or the VM manager 660 may cause the VM involved in the data transfer request to be suspended, depending on the circumstances of the virtual computer system 700C. Existing VM technology makes possible the suspension and resumption of a VM. This feature is found, for example, in the ESX Server product mentioned above. Moreover, co-pending U.S. patent application Ser. No. 09/497,978, filed 4 Feb. 2000 ("Encapsulated Computer System"), which is incorporated here by reference, discloses a mechanism for checkpointing the entire state of a VM.

The VM involved in a data transfer request may be suspended for various reasons, such as to reduce the load on system resources. For example, suppose again that the first and second NICs 180A and 180B have been configured into a single bond. Suppose further that the VMs 200 and 200N have been assigned to the use the bond, and that both VMs are actively issuing data frames for transmission on the network. Suppose further that a NIC failure occurs that prevents any further use of the first NIC 180A, so that only the second NIC 180B may be used for data transfers for the VMs 200 and 200N. Suppose further that the VM 200N has been assigned a higher priority than the VM 200 and that the VM 200N will use substantially the entire bandwidth provided by the single NIC 180B, or suppose that the VM 200N has been guaranteed substantially the entire bandwidth provided by the second VM 180B. Suppose further that the VM 200 issues another data frame for transmission on the network, but that, at the step 810, the NIC manager 642C decides to discard the data frame because of the limited network bandwidth provided by the single NIC 180B and the bandwidth demanded by the higher priority VM 200N. With the reduced network bandwidth and the competition from the higher priority VM 200N, the lower priority VM 200 may not get much network bandwidth until the NIC failure is corrected and a failback occurs. In this situation, the NIC manager 642C may decide to suspend the VM 200, perhaps until the failure is corrected and a failback occurs. Suspending the VM 200 in this situation may reduce system overhead and/or it may prevent the VM 200 from consuming precious network bandwidth.

In some situations, a VM may be suspended due to a limitation on system resources without there being any failures within the computer system or the computer network. One important example of this involves a Denial of Service (DoS) attack on a computer system or network. DoS attacks have been getting increased notoriety, and defenses against such attacks have been receiving greater attention. Numerous resources are available describing different types of DoS attacks and different measures that may be taken to reduce the threat of such attacks. For example, the CERT Coordination Center at the Software Engineering Institute, which is a federally funded research and development center operated by Carnegie Mellon University, provides numerous such resources, including a web site on the World Wide Web, at "cert.org."

Referring again to FIG. 3, suppose that the NICs 180A, 180B and 180C are connected to the Internet through the switch 20 and a local area network. Suppose further that the computer system is subjected to a DoS attack in which the connection to the Internet is flooded with a large amount of data traffic. The flooding of data through the connection may indirectly limit the amount of data that can be transferred through the NICs 180A, 180B and 180C. The NIC manager 642C may not be able to provide all of the VMs 200 to 200N with the network bandwidth they need, either for outgoing traffic or incoming traffic, or both. If there are one or more VMs 200 to 200N that have a relatively low priority relative to the other VMs, then these lower priority VMs may be suspended so that the higher priority VMs can use all of the available network bandwidth. Using such a remedy may limit the adverse effects of the attack.

Depending on the circumstances, however, it may not be desirable to suspend any of the VMs 200 to 200N, or enough of the VMs 200 to 200N to alleviate the network bandwidth bottleneck. In fact, the act of suspending VMs in many situations would be viewed as succumbing to the DoS attack, and the suspended VMs would be seen as victims of the attack. In such situations, other options may be preferred.

One such option involves avoiding the link to the Internet that is being adversely affected by the attack. Suppose a virtual computer system has a first set of one or more NICs connected through a first broadband connection to the Internet and a second set of one or more NICs connected through a second broadband connection also to the Internet. Suppose further that a VM is currently using the first set of NICs to communicate over the Internet, but that the VM is also configured to be able to use the second set of NICs to communicate over the Internet. Suppose further that the first broadband connection is subjected to a DoS attack such as described above. However, suppose that suspending the VM is not a desirable option. In this case, the NIC manager 642C may effectively failover from the first broadband connection to the second broadband connection by using the second set of NICs, instead of the first set of NICs. Depending on the nature of the attack and the entire broadband connection environment, switching over to using the second broadband connection may avoid or limit the adverse effects of the attack.

Performing such a failover in the NIC manager 642B or 642C of this invention is particularly advantageous because the NIC manager encounters incoming network data before any VM that might be affected by the data (or requests for data). Also, unlike other possible DoS defense mechanisms, the NIC manager only encounters traffic related to the virtual computer system, and not other network devices, making it easier for the NIC manager to detect a DoS attack related to the virtual computer system. This improves the NIC manager's ability to view network traffic and detect a DoS attack, and it enables the NIC manager to respond quickly to a DoS attack, to try to protect the VM from any adverse effects of the attack. The NIC manager may also implement an automated DoS intrusion detection system, that scans incoming data frames for indications of possible DoS attacks, to further improve its ability to detect an attack as quickly as possible. The intrusion detection system may scan for a wide variety of possible indications, such as the use of a TCP/UDP (user datagram protocol) port that was used in a prior DoS attack or a data bit pattern that matches a bit pattern found within a known attack or virus. The intrusion detection system may be substantially similar to any of a variety of existing intrusion detection systems, such as one of the Entercept intrusion prevention solutions from Network Associates Technology, Inc.

Depending on the circumstances, if the NIC manager detects a possible DoS attack, the NIC manager may attempt to limit the VM's response to the attack. As is well known, responses to DoS attacks frequently exacerbate the situation, such as by further increasing network traffic levels. In fact, in some DoS attacks, the anticipated response is a primary element in the strategy for disrupting the service. However, by responding quickly, the NIC manager may be able to failover to a different network connection, or take other defensive measures, before the VM or other network devices crash or suffer other harm, such as by getting inundated with network traffic. The NIC manager may even delay the processing by the VM of suspicious incoming data frames, to give the NIC manager more time to assess the risk and take evasive action, before allowing the VM to respond. For example, the NIC manager may delay sending an interrupt to the VM when the suspicious data frames arrive, or the NIC manager may cause the VM to be temporarily suspended, or the NIC manager may cause the resource manager to simply not schedule the VM for execution on the CPU(s) for a period of time, or to be scheduled for a reduced number of CPU cycles over a period of time.

In some situations, however, it may not be possible to failover to a second network connection to avoid a network bandwidth bottleneck while the VM continues running on the same physical computer. In such a situation, it may still be possible to avoid the bottleneck, however, by migrating the VM to a different physical computer that has access to another network or network connection.

At the step 822, the NIC manager 642C may decide to migrate a VM from one physical server system to another. The migration of VMs is disclosed in U.S. patent application Ser. No. 10/319,217 ("Virtual Machine Migration"), which is incorporated here by reference. In general terms, a VM can be migrated from a source server to a destination server, with only a slight interruption in the execution of the applications running within the VM. A VM may be migrated to another server in this manner for a variety of reasons. For example, suppose again that the first and second NICs are joined together in a bond, and that several VMs within the virtual computer system 700C of FIG. 5 are actively transmitting data across the network when the first NIC 180A fails, limiting the network data bandwidth for the bond to the bandwidth provided by the second NIC 180B. The single NIC 180B may not be able to provide enough bandwidth for all of the VMs that are using the bond. To resolve this situation, one or more VMs may be migrated to another server computer that has not had any NIC failures. Once the one or more VMs are running again on the destination server, they will again have access to the full network bandwidth of a fully functional server.

Next, at the step 824, the NIC manager 642C may take various other actions, based on the current status and configuration of the virtual computer system 700C. As described above, the NIC manager 642C and/or other units within the kernel 600C have access to both VM-specific information and NIC management information. Having both types of information available gives the NIC manager 642C and the kernel 600C greater flexibility in controlling the VMs and their access to system resources, and it leads to better decisions regarding which particular actions should be taken, based on the detailed requirements of the entire computer system and the detailed status of the virtual computer system 700C. The options of suspending a VM at the step 820 and migrating a VM at the step 822 are two examples of actions that may be taken based on the combination of VM-specific information and NIC management information. Various other actions are also possible, depending on the particular circumstances of the implementation. As an example of one of the many possible actions that may be taken at the step 824, if a VM is suspended at the step 820, a system alert may be raised to a system administrator or an email notice may be distributed to end-users, informing them that a service provided by an application within the VM has been suspended. Combining VM-specific information with NIC management information to make NIC management decisions and/or VM-specific decisions can provide numerous important advantages. All of these advantages are in addition to the important advantages described above that can be achieved by implementing a NIC teaming solution in the kernel of a virtual computer system, either as a driver or integrated into the kernel, instead of having to implement a NIC teaming solution in each of the guest OSs, for which NIC teaming is desired, for example.

If a decision is made to transfer the data frame at the step 810, then, after the step 816, the method of FIG. 5 proceeds to a step 828. Meanwhile, if a decision is made to discard or queue the data transfer request at the step 810, then, after the step 824, the method of FIG. 5 also proceeds to the step 828. At the step 828, the method terminates.

The above description has been given primarily from the perspective of the kernel 600C. However, the benefits of the invention are primarily seen through more efficient and effective execution of the VMs and the applications running thereon, without having to implement a NIC teaming solution in any of the VMs. The VMs generally do not see all of this gathering of information, making decisions and taking appropriate actions. Instead, with respect to the computer network, a VM only sees a single virtualized NIC 280 and a single, standard NIC driver 281. The guest OS only needs to interface with this one device in a direct and straightforward manner, without any NIC teaming concerns. However, this simple virtual NIC represents the VM's share of a set of multiple physical NICs controlled by a sophisticated NIC teaming solution. The guest OS reaps the benefits of NIC teaming, such as a reliable, higher bandwidth network connection, without itself having to do any NIC teaming. The guest OS doesn't even know that multiple NICs are involved with network access. Instead, the guest OS simply writes data to, and receives data from, the virtualized NIC. All the NIC teaming and other NIC management functions are performed by the NIC manager 642C within the kernel 600C. All the benefits of these NIC management functions are also provided to each of the other VMs in the virtual computer system 700C, without each VM having to implement a NIC teaming solution. Also, none of the VMs have to adapt to any changes in the configuration of NICs, such as when an extra NIC is added. Any changes in the NIC configuration are handled by the NIC manager 642C within the kernel 600C and are transparent to the VM's. This further enhances the portability of the VMs because they do not have to be customized to the NIC configuration or make any changes due to changes in the NIC configuration.

As described above, the second embodiment of the invention integrates a NIC manager into the kernel of a virtual computer system, which gives the NIC manager, and/or other units within the kernel, concurrent access to VM-specific information and to NIC management information. Having access to both of these types of information improves data routing decisions of the NIC manager, and it improves VM management decisions and system resource sharing decisions of the NIC manager and other units within the kernel. These same benefits can be derived by various other embodiments of a NIC manager within a virtual computer system, so long as VM-specific information and NIC management information are both used to reach data routing decisions, VM management decisions and/or system resource sharing decisions, along with other possible types of decisions. For example, in the virtual computer system described briefly above, in which a VMM is co-resident with a host operating system, so that there is no kernel, the NIC manager may be integrated into the VMM. In this case, functions of the VM manager and the resource manager may also be implemented in the VMM. Such an implementation may also lead to some or all of the benefits described above.

The above description of the invention focused mostly on Ethernet technology mostly because Ethernet technology is more common than other networking technologies. However, the invention may also be implemented in connection with other existing and future network technologies, including a mix of multiple network technologies. For example, referring again to the system of FIG. 2, instead of being connected to an Ethernet network through the switch 20 as described above, suppose that the first NIC 180A and the second NIC 180B are both connected to a token ring network, and they are both assigned to a common NIC teaming bond by a system administrator. Suppose further that a system administrator assigns the virtual NIC 280 to the bond, to enable the VM 200 to access the token ring network. The virtual NIC 280 may still be an Ethernet NIC, however, so that the VM 200 can access the token ring network, without even having a token ring driver. Similarly, a token ring driver in the guest OS 220 could be used to access an Ethernet network through physical Ethernet NICs. At the same time, however, the third NIC 180C may be connected to an Ethernet network through the switch 20, and the VM 200 may also be given access to the Ethernet network using a second virtual NIC assigned to the third physical NIC. In this case, the NIC manager 642B may provide failover and failback capabilities to the VM 200 in connection with its access to the token ring network by switching between the first and second physical NICs 180A and 180B. Providing a load distribution function in this situation, however, generally would not be advantageous because of the nature of the token ring network.

What is claimed is:

1. A method for responding to a request to transfer an outgoing data frame from a virtual computer system to a computer network, the outgoing data frame comprising at least data to be transmitted and at least one of a layer 2 and layer 3 destination address, the virtual computer system comprising a host platform and a plurality of virtual machines (VMs) executing as guests on the host platform via virtualization software, the virtualization software comprising one or more layers of software interfacing between the VMs and the host platform, the virtual computer system further comprising a plurality of physical network interface cards (NICs), wherein each VM includes at least one virtual NIC, the method comprising the steps of:

obtaining access by a NIC manager to the outgoing data frame, the outgoing data frame being provided by a particular one of the VMs via the virtual NIC of the particular VM, the NIC manager being a component of the virtualization software and being enabled to access data frames provided by any of the virtual NICs of the plurality of VMs;

receiving, in the NIC manager, NIC management information related to one or more of the plurality of physical NICs;

receiving, in the NIC manager, VM-specific information related to one or more of the VMs in the virtual computer system; and based on the NIC management information and the VM-specific information, selecting a physical NIC from the plurality of physical NICs and transferring the outgoing data frame to the computer network over the selected physical NIC, such that the outgoing data frame is generated by one of a plurality of VMs and is transferred to the computer network via the selected physical NIC of the plurality of physical NICs.

2. The method of claim 1, in which the VM-specific information indicates an amount of network bandwidth that is allocated to the particular VM that provided the outgoing data frame.

3. The method of claim 1, in which the VM-specific information indicates a priority of the particular VM relative to the priorities of other ones of the VMs.

4. The method of claim 1, wherein:

a load distribution function is used in performing the selecting of the physical NIC over which to transfer the outgoing data frame;

the plurality of VMs comprises at least a first VM and a second VM and the plurality of physical NICs comprises at least a first physical NIC and a second physical NIC; and the load distribution function substantially always routes outgoing data frames provided by the first VM over the first physical NIC as long as the first physical NIC is available, and substantially always routes outgoing data frames provided by the second VM over the second physical NIC as long as the second physical NIC is available, and routes outgoing data frames provided by the first VM over the second physical NIC if the first physical NIC is not available, and routes outgoing data frames provided by the second VM over the first physical NIC if the second physical NIC is not available.

5. The method of claim 1, further comprising:

deciding, based on the NIC management information and the VM-specific information, whether to transfer the outgoing data frame;

discarding the outgoing data frame if a decision is made not to transfer the outgoing data frame; and performing the transferring of the outgoing data frame only if a decision is made to transfer the outgoing data frame.

6. The method of claim 5, in which the VM-specific information indicates an allocation to the one of the VMs that provided the outgoing data frame of an amount of network bandwidth and a the decision is made not to transfer the outgoing data frame when transferring the outgoing data frame would cause the allocation of network bandwidth to be exceeded.

7. The method of claim 5, wherein, if a decision is made not to transfer the data, a further decision is made, based on the NIC management information and the VM-specific information, whether to migrate the particular VM to another computer system, the method further comprising, when the further decision is to migrate the particular VM to the other computer system, causing the particular VM to be migrated to the other computer system.

8. A method for responding to a request to transfer an outgoing data frame from a virtual computer system to a computer network, the outgoing data frame comprising at least data to be transmitted and at least one of a layer 2 and layer 3 destination address, the virtual computer system comprising a host platform and a plurality of virtual machines (VMs) executing as guests on the host platform via virtualization software, the virtualization software comprising one or more layers of software interfacing between the VMs and the host platform, the virtual computer system further comprising a plurality of physical network interface cards (NICs), each VM including at least one virtual NIC, the method comprising the steps of:

obtaining access by a NIC manager to the outgoing data frame, the outgoing data frame being provided by a virtual NIC of a particular one of the VMs, the NIC manager being a component of the virtualization software and being enabled to access data frames provided by any of the virtual NICs of the plurality of VMs;

receiving, in the NIC manager, NIC management information related to one or more of the plurality of physical NICs;

receiving, in the NIC manager, VM-specific information related to one or more of the VMs in the virtual computer system, the VM-specific information being at least one of an identity of the particular VM that provided the outgoing data frame, a priority of the particular VM that provided the outgoing data frame relative to priorities of other ones of the VMs, or an amount of network bandwidth that is allocated to the particular VM that provided the outgoing dataframe and the other ones of the VMs; and based on the NIC management information and the VM-specific information, selecting physical NIC from the plurality of physical NICs and transferring the outgoing data frame to the computer network over the selected physical NIC, such that the outgoing data frame is generated by one of a plurality of VMs and is transferred to the computer network via the selected physical NIC of the plurality of physical NICs.

9. The method of claim 8, in which the VM-specific information indicates the amount of network bandwidth that is allocated to the particular VM that provided the outgoing data frame.

10. The method of claim 8, in which the VM-specific information indicates the priority of the particular VM relative to the priorities of the other ones of the VMs.

11. The method of claim 8, in which the NIC management information indicates which one or more of the plurality of physical NICs is available for the transfer of the outgoing data frame.

12. The method of claim 11, in which the NIC management information further indicates a pending data transfer load for each of the plurality of physical NICs that are available for the transfer of the outgoing data frame.

13. The method of claim 8, wherein:
a load distribution function is used in performing the selecting of the physical NIC over which to transfer the outgoing data frame
the one or more VMs comprises at least a first VM and a second VM and the plurality of physical NICs comprises at least a first physical NIC and a second physical NIC; and
the load distribution function substantially always routes outgoing data frames provided by the first VM over the first physical NIC as long as the first physical NIC is available, and substantially always routes outgoing data frames provided by the second VM over the second physical NIC as long as the second physical NIC is available, and routes outgoing data frames provided by the first VM over the second physical NIC if the first physical NIC is not available, and routes outgoing data frames provided by the second VM over the first physical NIC if the second physical NIC is not available.

14. The method of claim 13, in which the outgoing data frames provided by the first VM are distinguished from outgoing data frames provided by the second VM by reference to a source physical address contained in a header of each outgoing data frame.

15. The method of claim 8, in which the NIC management information indicates whether a failover is occurring on one of the physical NICs and in which the particular VM is temporarily suspended if a failover is occurring on the one of the physical NICs.

16. The method of claim 8, further comprising:
deciding, based on the NIC management information and the VM-specific information, whether to transfer the outgoing data frame;
discarding the outgoing data frame if a decision is made not to transfer the outgoing data frame; and
performing the transferring of the outgoing data frame only if a decision is made to transfer the outgoing data frame.

17. The method of claim 16, in which the VM-specific information indicates an allocation of network bandwidth to the particular VM that provided the outgoing data frame of an amount of network bandwidth and the decision is made not to transfer the outgoing data frame when transferring the outgoing data frame would cause the allocation of network bandwidth to be exceeded.

18. The method of claim 16, wherein, if a decision is made not to transfer the data, a further decision is made, based on the NIC management information and the VM-specific information, whether to suspend the one VM, the method further comprising, when the further decision is to suspend the VM, causing the VM to be suspended.

19. The method of claim 8, wherein, if a decision is made not to transfer the data, a further decision is made, based on the NIC management information and the VM-specific information, whether to migrate the particular VM to another computer system, the method further comprising, when the further decision is to migrate the particular VM to the other computer system, causing the particular VM to be migrated to the other computer system.

* * * * *